(12) United States Patent
Bordin et al.

(10) Patent No.: US 9,719,265 B2
(45) Date of Patent: Aug. 1, 2017

(54) FLOOR UNDERLAYMENT FOR POSITIONING HEATING ELEMENTS

(71) Applicant: Progress Profiles SpA, Asolo (IT)

(72) Inventors: Dennis Bordin, Asolo (IT); Ugo Faotto, Carbonera (IT)

(73) Assignee: PROGRESS PROFILES SpA (IT)

( * ) Notice: Subject to any disclaimer, the term of this patent is extended or adjusted under 35 U.S.C. 154(b) by 0 days.

(21) Appl. No.: 15/070,960

(22) Filed: Mar. 15, 2016

(65) Prior Publication Data
US 2016/0273232 A1    Sep. 22, 2016

(30) Foreign Application Priority Data

Mar. 17, 2015  (EM) ................ DM/086173

(51) Int. Cl.
| | | |
|---|---|---|
| *E04C 2/52* | (2006.01) | |
| *E04F 15/18* | (2006.01) | |
| *F24D 3/14* | (2006.01) | |
| *F24D 13/02* | (2006.01) | |

(52) U.S. Cl.
CPC ............ *E04F 15/185* (2013.01); *F24D 3/141* (2013.01); *F24D 3/142* (2013.01); *F24D 13/02* (2013.01); *Y02B 30/26* (2013.01)

(58) Field of Classification Search
CPC ......... E04F 15/185; F24D 3/141; F24D 13/02
USPC ................................ 52/220.2, 385, 386, 389
See application file for complete search history.

(56) References Cited

U.S. PATENT DOCUMENTS

| | | | |
|---|---|---|---|
| 254,269 | A | 2/1882 | Brown |
| 1,485,370 | A | 3/1924 | Cumfer |
| 1,549,773 | A | 8/1925 | Hynes |
| 2,139,512 | A | 12/1938 | Nagorny |
| 2,956,785 | A | 10/1960 | Richl |
| 3,135,040 | A | 6/1964 | Watson |
| 3,235,712 | A | 2/1966 | Watson |
| 3,434,401 | A | 3/1969 | Kiewit |
| 3,487,579 | A | 1/1970 | Brettingen |
| 3,597,891 | A | 8/1971 | Martin |
| 3,695,615 | A | 10/1972 | Shoptaugh |
| 3,757,481 | A | 9/1973 | Skinner |
| 4,016,692 | A | 4/1977 | Jordan et al. |
| 4,183,167 | A | 1/1980 | Jatich |

(Continued)

FOREIGN PATENT DOCUMENTS

| | | |
|---|---|---|
| CA | 1186470 | 5/1985 |
| CH | 657690 | 9/1986 |

(Continued)

OTHER PUBLICATIONS

U.S. Appl. No. 29/493,206, filed Jun. 6, 2014, Larson.

(Continued)

*Primary Examiner* — Basil Katcheves
*Assistant Examiner* — Joshua Ihezie
(74) *Attorney, Agent, or Firm* — Sheridan Ross P.C.

(57) ABSTRACT

A floor underlayment for positioning and mounting a heating element beneath a finished floor is described. The floor underlayment comprises a plurality of studs extending upwardly from a base layer, where the outer wall of the studs forms an acute angle with the base layer and a smooth inner wall defines a cavity within each stud. Mounting corridors formed by rows or columns of adjacent studs are sized to receive and retain a heating element.

20 Claims, 27 Drawing Sheets

(56) References Cited

U.S. PATENT DOCUMENTS

| | | | |
|---|---|---|---|
| 4,250,674 A | 2/1981 | Feist | |
| 4,326,366 A | 4/1982 | Werner | |
| 4,338,994 A | 7/1982 | Hewing et al. | |
| 4,576,221 A | 3/1986 | Fennesz | |
| 4,640,067 A | 2/1987 | Hagemann et al. | |
| 4,640,854 A | 2/1987 | Radtke | |
| 4,923,733 A | 5/1990 | Herbst | |
| 4,995,471 A | 2/1991 | Hara et al. | |
| 4,997,308 A | 3/1991 | Welling, Jr. | |
| 5,042,569 A * | 8/1991 | Siegmund | F24D 3/143 |
| | | | 165/49 |
| 5,052,161 A | 10/1991 | Whitacre | |
| 5,078,203 A | 1/1992 | Shiroki | |
| 5,105,595 A | 4/1992 | Tokei et al. | |
| 5,131,458 A | 7/1992 | Bourne et al. | |
| 5,374,466 A | 12/1994 | Bleasdale | |
| 5,386,670 A | 2/1995 | Takeda et al. | |
| 5,447,433 A | 9/1995 | Perry, Jr. | |
| 5,480,259 A | 1/1996 | Thrower | |
| 5,499,476 A | 3/1996 | Adams et al. | |
| D370,034 S | 5/1996 | Kipfer | |
| D372,158 S | 7/1996 | Bonaddio et al. | |
| 5,585,154 A | 12/1996 | Rhoades | |
| 5,789,462 A | 8/1998 | Motani et al. | |
| 5,863,440 A | 1/1999 | Rink et al. | |
| 6,076,315 A | 6/2000 | Kondo | |
| 6,094,878 A | 8/2000 | Schluter | |
| 6,178,662 B1 | 1/2001 | Legatzke | |
| 6,434,901 B1 | 8/2002 | Schluter | |
| 6,805,298 B1 | 10/2004 | Corbett | |
| 6,918,217 B2 | 7/2005 | Jakob-Bamberg et al. | |
| D508,332 S | 8/2005 | Julton | |
| D541,396 S | 4/2007 | Fawcett et al. | |
| 7,250,570 B1 | 7/2007 | Morand et al. | |
| D551,152 S | 9/2007 | Funk et al. | |
| D568,006 S | 4/2008 | Shin | |
| D587,358 S | 2/2009 | Stephan et al. | |
| 7,585,556 B2 | 9/2009 | Julton | |
| 7,669,371 B2 | 3/2010 | Hill | |
| 8,002,241 B1 | 8/2011 | Shaw | |
| 8,176,694 B2 * | 5/2012 | Batori | E04F 15/18 |
| | | | 52/220.2 |
| 8,288,689 B1 | 10/2012 | Adelman | |
| 8,573,901 B2 | 11/2013 | De Souza Filho et al. | |
| D706,459 S | 6/2014 | Schluter et al. | |
| D712,159 S | 9/2014 | Clerici et al. | |
| 8,950,141 B2 | 2/2015 | Schluter et al. | |
| 9,188,348 B2 | 11/2015 | Larson | |
| D747,503 S | 1/2016 | Reynolds et al. | |
| 9,275,622 B2 | 3/2016 | Claeys et al. | |
| 9,284,693 B2 | 3/2016 | Tabibnia | |
| 9,328,520 B1 | 5/2016 | Kriser | |
| 2005/0184066 A1 | 8/2005 | Brooks et al. | |
| 2006/0260233 A1 | 11/2006 | Schluter | |
| 2006/0265975 A1 | 11/2006 | Geffe | |
| 2006/0278172 A1 | 12/2006 | Ragonetti et al. | |
| 2007/0056233 A1 | 3/2007 | Kang et al. | |
| 2008/0017725 A1 | 1/2008 | Backman et al. | |
| 2008/0173060 A1 | 7/2008 | Cymbalisty et al. | |
| 2008/0276557 A1 | 11/2008 | Rapaz | |
| 2008/0290503 A1 | 11/2008 | Karavakis et al. | |
| 2008/0290504 A1 | 11/2008 | Karavakis et al. | |
| 2008/0295441 A1 | 12/2008 | Carolan et al. | |
| 2009/0026192 A1 * | 1/2009 | Fuhrman | H05B 3/06 |
| | | | 219/523 |
| 2009/0230113 A1 | 9/2009 | Batori | |
| 2011/0047907 A1 * | 3/2011 | Smolka | F24D 13/024 |
| | | | 52/220.1 |
| 2014/0069039 A1 * | 3/2014 | Schluter | E04F 15/182 |
| | | | 52/390 |
| 2016/0010327 A1 | 1/2016 | Larson | |
| 2016/0033144 A1 | 2/2016 | Larson | |
| 2016/0047131 A1 * | 2/2016 | Larson | E04F 15/182 |
| | | | 52/173.1 |

FOREIGN PATENT DOCUMENTS

| | | |
|---|---|---|
| DE | 2840149 | 3/1980 |
| DE | 8413516 | 10/1984 |
| DE | 3317131 | 11/1984 |
| DE | 3730144 | 4/1988 |
| DE | 4201553 | 11/1992 |
| DE | 9114591 | 3/1993 |
| DE | 4230168 | 8/1993 |
| DE | 4226312 | 2/1994 |
| DE | 4242026 | 6/1994 |
| DE | 29609497 | 8/1996 |
| DE | 19750277 | 5/1999 |
| DE | 19828607 | 12/1999 |
| DE | 19936801 | 8/2000 |
| DE | 19912922 | 1/2001 |
| DE | 10040643 | 11/2001 |
| DE | 202006013453 | 11/2006 |
| DE | 102006004626 | 8/2007 |
| DE | 102006004755 | 8/2007 |
| EP | 60547 | 9/1982 |
| EP | 74490 | 3/1983 |
| EP | 133556 | 2/1985 |
| EP | 189020 | 7/1986 |
| EP | 367176 | 5/1990 |
| EP | 368804 | 5/1990 |
| EP | 437999 | 7/1991 |
| EP | 514684 | 11/1992 |
| EP | 0582031 | 2/1994 |
| EP | 947778 | 10/1999 |
| EP | 1054217 | 11/2000 |
| EP | 1068413 | 1/2001 |
| EP | 1074793 | 2/2001 |
| EP | 1096079 | 5/2001 |
| EP | 1338413 | 8/2003 |
| EP | 1063478 | 10/2003 |
| EP | 1208332 | 3/2004 |
| EP | 1770337 | 4/2007 |
| EP | 001079214-0005 | 3/2009 |
| FR | 2695986 | 3/1994 |
| FR | 2746426 | 9/1997 |
| GB | 2006548 | 5/1979 |
| GB | 2097836 | 11/1982 |
| GB | 2364565 | 1/2002 |
| GB | 2373042 | 9/2002 |
| JP | H01-139935 | 6/1989 |
| JP | H05-264051 | 10/1993 |
| JP | 2008-025295 | 2/2008 |
| WO | WO 82/03099 | 9/1982 |
| WO | WO 95/22671 | 8/1995 |
| WO | WO 2004/111544 | 12/2004 |

OTHER PUBLICATIONS

U.S. Appl. No. 29/547,874, filed Dec. 8, 2015, Larson.

"Illustrated price list BT 7," Schlüter-Systems KG, Dec. 7, 28 pages.

Schluter Systems, Profile of Innovation, Illustrated Price List, Jan. 1, 2008, 2 pages.

International Search Report and Written Opinion for International (PCT) Patent Application No. PCT/US2015/045688, mailed Nov. 12, 2015 9 pages.

Official Action for U.S. Appl. No. 12/550,111, mailed Apr. 26, 2013 12 pages.

Official Action for U.S. Appl. No. 12/550,111, mailed Dec. 5, 2013 14 pages.

Official Action for U.S. Appl. No. 12/550,111, mailed Jan. 23, 2015 16 pages.

Notice of Allowance for U.S. Appl. No. 12/550,111, mailed Aug. 28, 2015 11 pages.

Notice of Allowance for U.S. Appl. No. 12/550,111, mailed Sep. 22, 2015 10 pages.

Official Action for U.S. Appl. No. 29/493,206, mailed Nov. 19, 2015 4 pages. Restriction Requirement.

Official Action for U.S. Appl. No. 14/860,065, mailed Mar. 15, 2016, 6 pages.

Third Party Submission for U.S. Appl. No. 14/860,065, mailed Apr. 28, 2016, 18 pages.

(56) References Cited

OTHER PUBLICATIONS

Notice of Allowance for U.S. Appl. No. 14/880,859, mailed Mar. 7, 2016, 16 pages.
Official Action for U.S. Appl. No. 14/829,108, mailed Jan. 20, 2016, 10 pages.
"5 Facts You May Not Know About Heated Flooring," southcypress.com, Sep. 12, 2015, 4 pages [retrieved Aug. 3, 2016 from: https://web.archive.org/web/20150912220312/http://www.southcypress.com/v3/articles/heated-flooring.htm].
"Ditra Heat," GlensFalls Tile & Supplies, Sep. 4, 2014, 1 page [retrieved Aug. 3, 2016 from: http://www.glensfallstile.com/general-tips/ditra-heat/772/].
Official Action for U.S. Appl. No. 29/493,206, mailed Aug. 10, 2016 8 pages.
Official Action for U.S. Appl. No. 29/547,874, mailed Aug. 10, 2016 8 pages.
Third Party Submission for U.S. Appl. No. 14/829,108, mailed Aug. 17, 2016, 17 pages.
Official Action for U.S. Appl. No. 15/185,576, mailed Aug. 24, 2016 14 pages.
Polypipe Brochure; "Redefining Heating Systems," www.ufch.com; Polyplumb: Hot & Cold Plumbing & Heating System; © 2006, Polypipe Group; Printed: Feb. 2007, 44 pages.
Third Party Submission for U.S. Appl. No. 14/860,065, filed Jun. 23, 2016 25 pages.
Third Party Submission for U.S. Appl. No. 14/860,065, filed Jul. 8, 2016 26 pages.
Notice of Allowance for U.S. Appl. No. 14/860,065, mailed Sep. 14, 2016 10 pages.

\* cited by examiner

FLOOR UNDERLAYMENT FOR POSITIONING HEATING ELEMENTS

CROSS-REFERENCE TO RELATED APPLICATIONS

This application claims priority to International Registration Certificate DM/086 173, which was filed on Mar. 17, 2015, the entirety of which is incorporated by reference herein.

FIELD

Embodiments of the present disclosure are generally related to underlayments associated with radiant floor or wall heating systems. More specifically, one embodiment of the present disclosure includes a plurality of studs that are adapted to locate and firmly secure wires or pipes associated with a radiant heating system.

BACKGROUND

The use of in-floor and in-wall heating and cooling systems that operate based on the conduction and radiation forms of heat transfer is well known. Such systems are used, for example, as an alternative to forced air heating and cooling systems, which operate based on convective heat transfer. Primarily, in-floor and in-wall systems comprise a series of pipes that circulate heated water or resistive electric cable, mesh or film that generates heat when an electric current is applied thereto. In-floor radiant heating technology in particular is used commonly in homes and businesses today.

Electrical floor heating systems have very low installation costs and are well suited for kitchens, bathrooms or rooms that require additional heat, such as basements. One advantage of electric floor heating is the height of installation. For example, floor buildup can be as little as about one millimeter. Electric underfloor heating can also be quickly installed, in as little as half a day to a day depending on the size of the area to be heated. In addition, warm up times are generally decreased because the cables are installed proximate to the finished flooring, i.e. tile, where they can begin to heat the flooring immediately. In contrast, forced-air and water-based heating systems generate hot air or water in a single centralized location, and then direct the hot air or water to a location that needs to be heated, with attendant transmission losses and reduced efficiency. Electric systems are also offered in several different forms, such as those that utilize a long continuous length cable or those that employ a mat with embedded heating elements. In order to maximize heat transfer, a bronze screen or carbon film heating element may be also used. Carbon film systems are normally installed under the wire and onto a thin insulation underlay to reduce thermal loss to the sub floor. Vinyls, carpets and other soft floor finishes can be heated using carbon film elements or bronze screen elements.

Another type of in-floor heating system is based on the circulation of hot water, i.e., a "hydronic" system. In a hydronic system, warm water is circulated through pipes or tubes that are incorporated into the floor. Such systems generally use pipes from about $11/16$ inch to 1 inch to circulate hot water from which the heat emanates. The size of the pipes or tubes generally translates into a thicker floor, which may be undesirable. One other disadvantage of hydronic systems is that a hot water storage tank must be maintained at all times, which is less efficient than an electric floor heating system.

SUMMARY

Despite their various benefits, known underlayment systems, including those described above, suffer from a number of flaws, including inadequate surface area for contact with and securement of heating elements; sharp (or insufficiently rounded) angles that could potentially damage or prematurely age wires or other heating elements, and that increase the likelihood of cracking of thinset mortar or other adhesive used to bond a veneer or finished flooring to the underlayment; design features that result in strong mechanical bonds in orthogonal directions but not in other directions; increased cost due to excess use of raw materials during manufacture; and so forth. The present disclosure describes an underlayment that addresses these and other shortcomings of underlayment systems known in the art.

In particular, an underlayment according to the present disclosure includes a base layer (alternatively referred to as a base member, a base, and/or a mat) with a plurality of studs (alternatively referred to as supports and/or bosses) protruding upwardly/perpendicularly therefrom. In one embodiment, the plurality of studs is arrayed in rows and columns on the base layer. The shape of each stud, and the intersection between each stud and the base layer, can be carefully designed to overcome the disadvantages of the prior art, including those identified above. In particular, the supports of the present disclosure include a square shape with rounded corners; a filleted or blended intersection between the outer wall of the support and the base layer; a smooth interior wall that forms a bowl or cavity within each support; and a flat top surface of each support that surrounds the bowl or cavity. In embodiments, one or more raised rings or crowns extend upward from the flat top surface. Additionally, in embodiments of the present disclosure, the size of each support, and the spacing between each support, is selected to allow heating elements to fit (snugly, loosely, or otherwise) in the spaces between adjacent supports, and to provide desired spacing between adjacent heating element segments.

According to one embodiment of the present disclosure, a floor underlayment includes a base layer and a plurality of studs extending from the base layer in rows and columns. Each stud includes an outer wall that forms an acute angle with the base layer; a top surface; and an inner wall sloping downwardly and inwardly from the top surface to near the base layer, the inner wall having a smooth, substantially continuous surface and defining a cavity within the stud.

Various embodiments of the floor underlayment include additional features. For example, the inner wall of each stud may surround a perimeter of a hole in the base layer. Each stud may further include a raised ring extending upwardly from the top surface. The plurality of studs may be integral with the base layer or separately formed therefrom. A cross section of the outer wall of each stud may be substantially square with rounded corners. The rounded corners of each outer wall may have a radius of curvature of about one fourth of the width of the stud. The floor underlayment may include a heating element mounted between adjacent studs.

In another embodiment according to elements of the present disclosure, a mat for mounting a heating element includes a plurality of mounting corridors having an open top, a floor, and sides defined by an outer wall of each of a plurality of adjacent and sequential supports extending upwardly from the floor. Each outer wall may be positioned at an acute angle with the floor and having a fillet at the intersection of the outer wall and the floor.

Again, various embodiments of the mat include additional features. The width of each of the plurality of mounting corridors may increase from a local minimum width at the top of the mounting corridor to a local maximum width near the floor of the mounting corridor. The outer wall may define a perimeter of each of the plurality of adjacent and sequential supports and the fillet extends around the entire perimeter. A distance, at a given height, between the outer walls of adjacent ones of the plurality of adjacent and sequential supports may gradually increase immediately before each intersection of one of the plurality of mounting corridors with another one of the plurality of mounting corridors, due to rounded corners on the outer walls of each of the plurality of adjacent and sequential supports. The floor and each of the plurality of adjacent and sequential supports may be formed from the same material, and may be integrally formed (i.e. formed as one piece). Each of the plurality of adjacent and sequential supports may comprise a top surface substantially parallel to the floor. A raised ring may extend from the top surface of each of the plurality of adjacent and sequential supports. Additionally, a smooth inner wall may slope downwardly from near the top surface of each of the plurality of adjacent and sequential supports to near the floor, the inner wall defining a cavity having a maximum width near the top surface and a minimum width near the floor.

According to further embodiments of the present disclosure, a subfloor mat includes a base member formed of a flexible material, and a plurality of studs protruding upwardly from the base member. Each stud comprises an outer wall defining a perimeter of the base member; a fillet at the intersection of the outer wall and the base member; and a smooth inner wall sloping from a top surface of the stud to a position near the bottom of the stud, the smooth inner wall defining a cavity within the perimeter of the stud.

Embodiments of the subfloor mat may include a number of additional features. The outer wall may form an acute angle with the base member. The outer wall may include alternating substantially planar portions and substantially curved portions. The cavity may have a maximum width near the top of the support and a minimum width near the bottom of the support. A heating element may be positioned between adjacent ones of the plurality of studs.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure, but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed description of the various aspects, embodiments, and configurations of the disclosure, as illustrated by the drawings referenced below.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
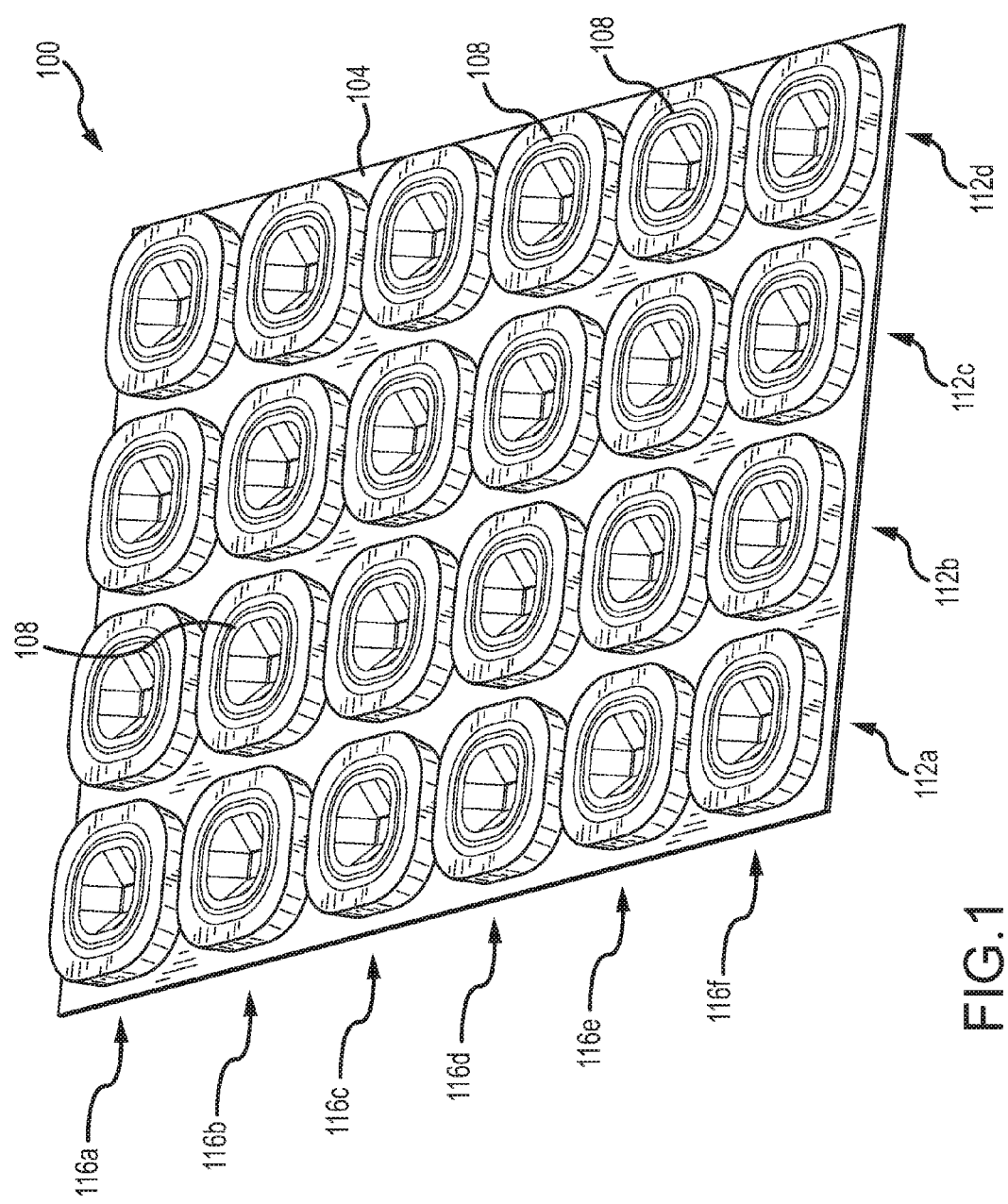
FIG. 1 is a perspective view of an underlayment according to an embodiment of the present disclosure.

FIG. 1 depicts a floor underlayment or mat 100 according to an embodiment of the present disclosure. The underlayment 100 comprises a base layer or floor 104, on which an array of studs 108 is positioned with evenly spaced columns 112a-d and rows 116a-f. The number of columns 112 and rows 116 of supports 108 may vary depending on the dimensions of the base layer 104, which may be provided, for example, in small mats large enough to fit only four studs 108 (e.g. two columns 112 of two studs 108 each, or two rows 116 of two studs 108 each), or in large mats sized to cover entire rooms or hallways, with dimensions measured in meters and with tens or hundreds of columns 112 and/or rows 116, each comprising tens or hundreds of studs 108. In embodiments, an underlayment 100 may be provided with dimensions of 1 meter by 5 meters, or of 1 meter by 15 meters. The underlayment 100 (or, in embodiments, just the base layer 104) may be made of a material that can be readily cut to facilitate installation of the underlayment 100.

In embodiments, the base layer 104 is made of a flexible material, e.g. so that a large mat of underlayment 100 can be rolled and unrolled without damage. Also in embodiments, the studs 108 are made of a semi-rigid material, with sufficient flexibility to mount a heating element between adjacent studs, but with sufficient rigidity to hold a mounted heating element in place, and to support the weight of a veneer or other finished flooring (together with any necessary thinset mortar or other bonding material, padding, etc.) installed on top of the underlayment 100. In embodiments, the base layer 104 and the studs 108 are made of the same material. In the present embodiment, the base layer 104 comprises a plurality of layers in at least some portions of the base layer 104. In additional embodiments, the studs 108 are integral with the base layer 104 (i.e., formed as one piece of a single, continuous material). In other embodiments, the studs 108 are formed of a different material than the base layer 104. In still other embodiments, the studs 108 are manufactured separately from the base layer 104, and are then mounted to base layer 104. The underlayment 100 (or parts thereof) may be made of waterproof material.

Figure 2:
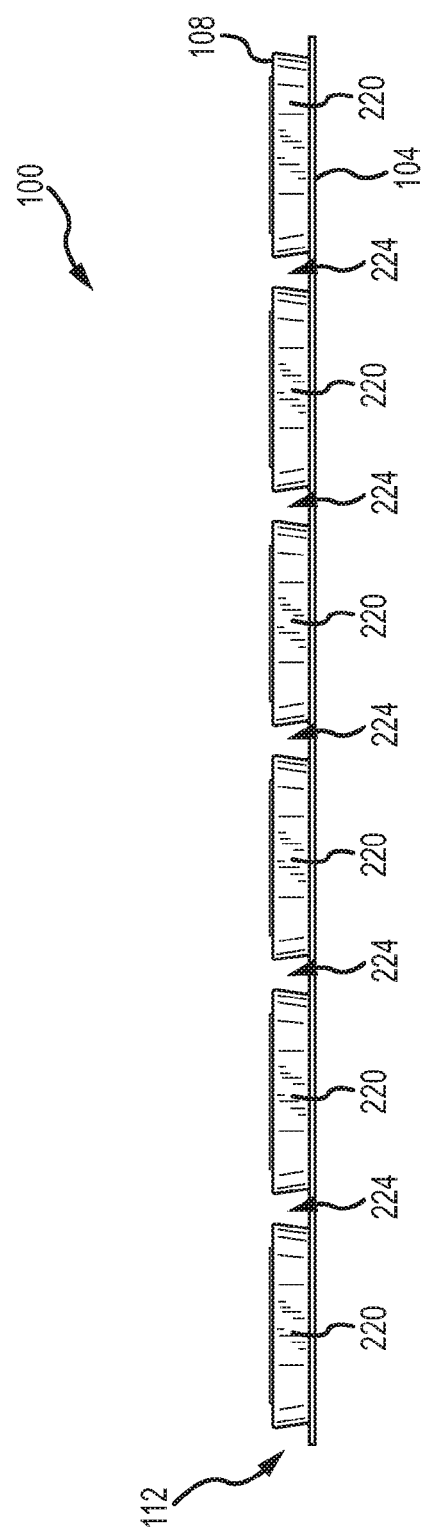
FIG. 2 is an side elevation view of the underlayment of FIG. 1.

Referring now to FIG. 2, the outer wall 220 of each stud 108 slopes outward as it protrudes upwardly from the base layer 104, thus creating an overhang extending towards the adjacent stud 108. As a result of this slope, the outer wall forms an acute angle with the base layer 104. The outer walls 204 of rows of adjacent studs 108, together with the base layer 104, form mounting corridors 224 for heating elements. These mounting corridors 224 may be sized to fit one or more varieties of heating elements, including, for example, wire, cable, tubing, piping, and so forth. More specifically, the dimension between each stud 108 (or, in other words, the width of a given mounting corridor 208), measured at or near the bottom of each stud 108 (e.g. just above the base layer 104) is, in embodiments, larger than the diameter or width of the heating element for which the underlayment 100 is intended to be used, while the dimension between the overhangs of each stud 108 (or, in other words, the width of a given mounting corridor 208 as measured at or near the tops of the studs 108) is less than the width or diameter of the heating element. A heating element is mounted on the underlayment 100 by pressing the heating element into one or more mounting corridors 224, so that the outer walls 220 briefly yield to the heating element (or vice versa), then return to their original configuration. Then, the outer walls 220 of the studs 108, with their outward slope, hold the heating element in place, thus helping to ensure that the heating element will not be damaged by undesired movement and will remain in place during installation.

In use, an underlayment or mat 100 may be placed on a foundation surface or subfloor. A layer of adhesive or bonding material may be used to affix the underlayment 100 to the surface on which it is placed. Either before or after the underlayment 100 is affixed to the foundation surface, one or more heating elements may be mounted thereto. Common heating elements include wire or cable (e.g. for electrical heating) and tubing or piping (e.g. for hot water heating), although the present disclosure is not limited to these or any other heating elements. In a typical installation, after the heating element is mounted to the underlayment 100, thinset mortar or other adhesive is applied over the underlayment 100. The thinset mortar or adhesive may fill in the various cavities of the underlayment 100, leaving a substantially flat surface upon which the finished flooring is installed. The finished flooring may be, for example, tile, hardwood, laminate, vinyl, stone, carpet, and so forth. In embodiments, the finished flooring includes a layer of padding or other filler material between the underlayment 100 and the upper flooring surface. The padding or other filler material may be used in addition to or instead of the thinset mortar or other adhesive.

Figure 3:
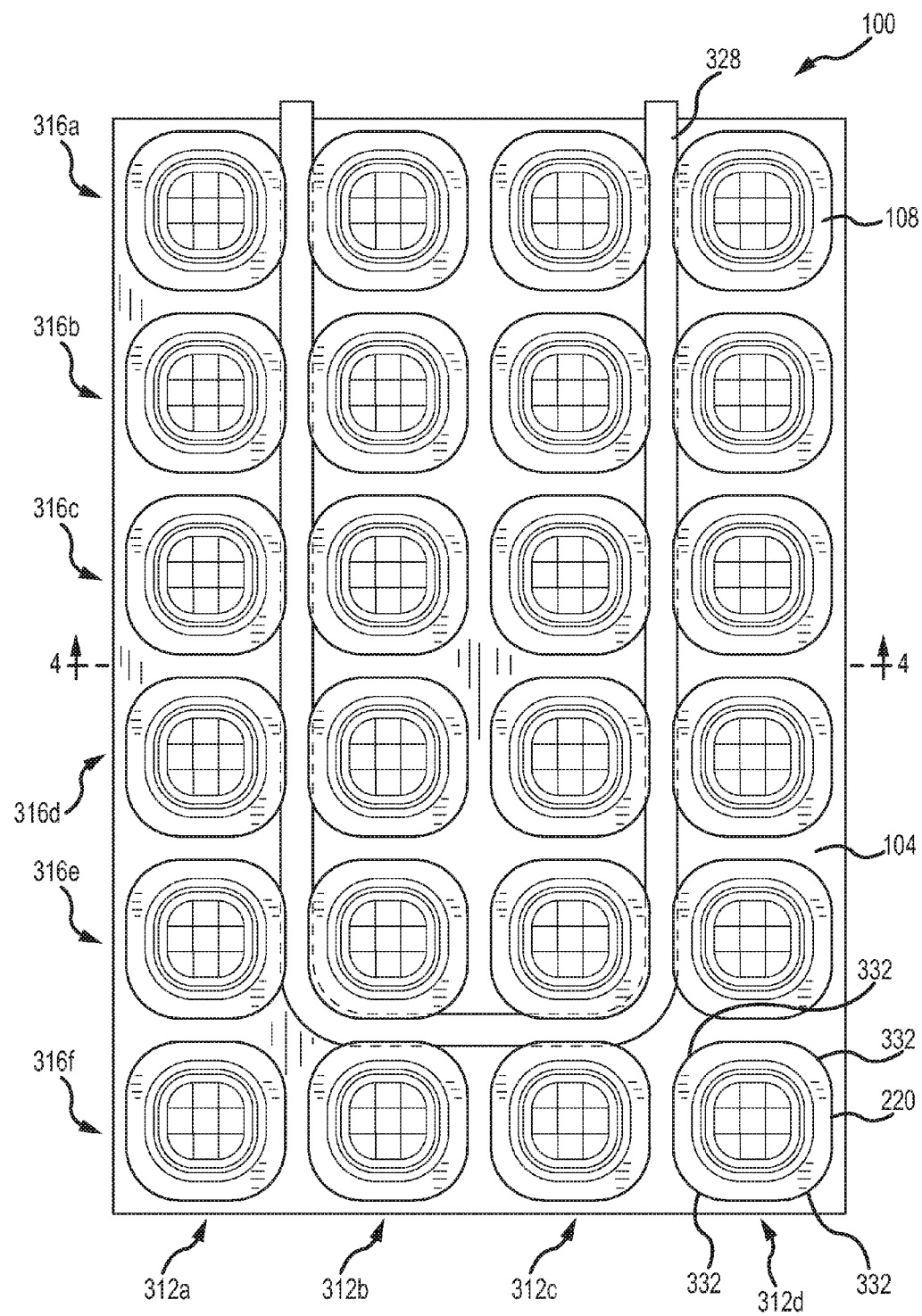
FIG. 3 is a top plan view of the underlayment of FIG. 1, showing a heating element positioned between adjacent studs.

FIG. 3 shows a heating element 328 mounted in the space between adjacent studs 108 of underlayment 100. More specifically, the heating element 328 is installed so that it runs in between columns 312*a* and 312*b*, bends approximately ninety degrees to run in between rows 316*e* and 316*f,* then bends another approximately ninety degrees to run in between columns 312*c* and 312*d*. As discussed above, the heating element 328 has a width or diameter greater than the dimension between adjacent studs 108 as measured at or near the top of the studs 108, but smaller than the dimension between adjacent studs 108 as measured at or near the bottom of the studs 108 (just above the base layer 104). Also visible in FIG. 3 are the rounded corners 332 of each outer wall 220 of studs 108. In the present embodiment, rounded corners 332 have a radius of curvature equal to approximately one fourth of the width of the studs 108 (where the width of the stud 108 is measured from one side of the stud 108 to the opposite side, at the same height). This relatively large radius of curvature reduces bending stress in the heating element 328 in areas where the heating element 328 changes direction, and thus helps to avoid damaging or prematurely aging the heating element 328, while also providing substantial surface area for the stud 108 to contact and support the heating element 328. The rounded corners 332 also help to reduce stress concentrations in any thinset mortar or other adhesive applied over the underlayment 100, which in turn helps to prevent or reduce cracking of—and thus to increase the longevity of—the adhesive. In other embodiment, the radius of curvature may be more or less than one fourth of the width of the studs 108.

Installation guidelines for different kinds of heating elements may specify, for example, the maximum or minimum length of heating element that may be safely used over a given surface area. In embodiments of the present disclosure, the size and spacing of the studs 108 may be optimized for a particular type or brand of heating element. Thus, for example, the size and spacing of the studs 108, together with the overall dimension of the mat 100, may be selected so that the maximum amount of a given heating element that may be used in a given area (e.g., 12 linear meters per square meter) can be readily installed.

Figure 4:
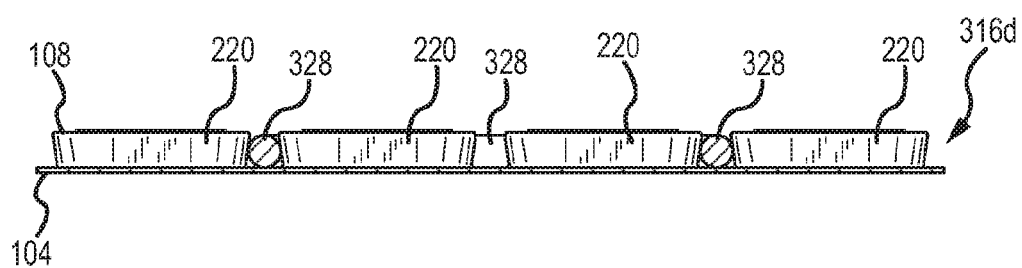
FIG. 4 is a front elevation view of the underlayment of FIG. 3, showing the heating element positioned between adjacent studs.

The mounted heating element 328 is also visible in FIG. 4, which provides a cross-sectional view of the underlayment 100 taken along line 4 of FIG. 3. As evident from this view, the outer walls 220 of the studs 108 extend partially over the heating element 328, thus holding the heating element 328 in place. The portion of the heating element that runs in between rows 316*e* and 316*f* can also be seen through the mounting corridor in between the two center studs.

Figure 5:
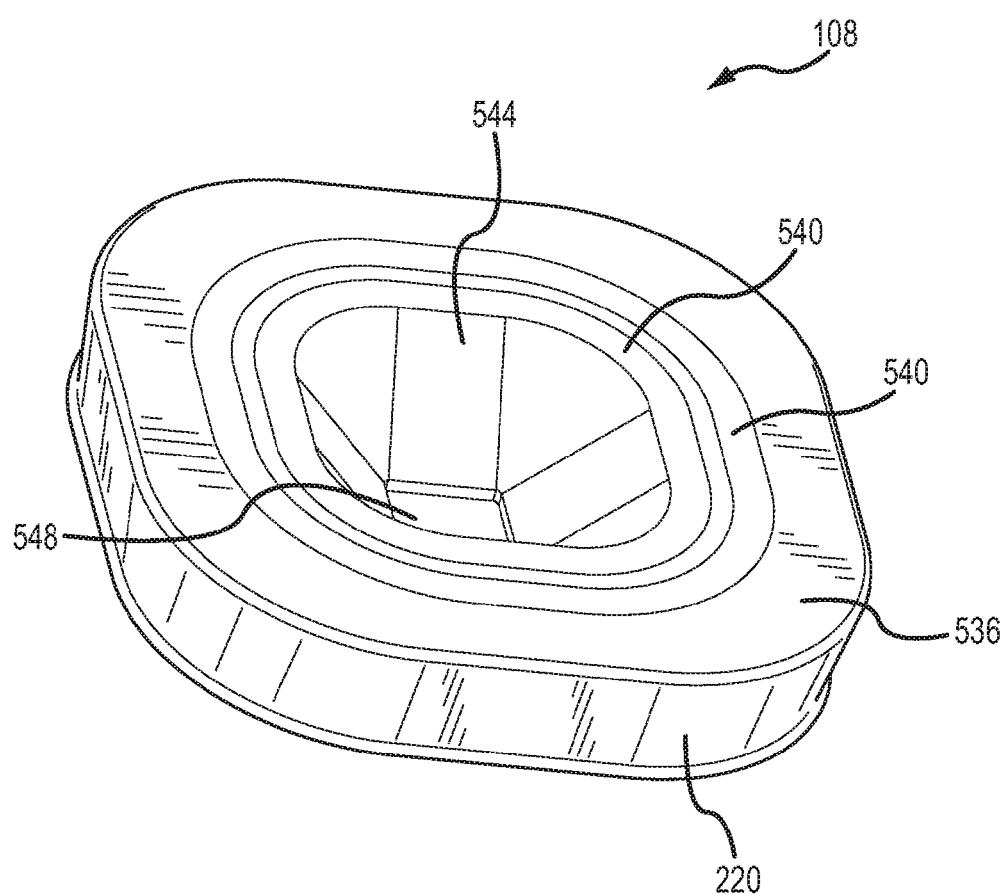
FIG. 5 is a perspective view of a stud according to embodiments of the present disclosure.
Figure 6:
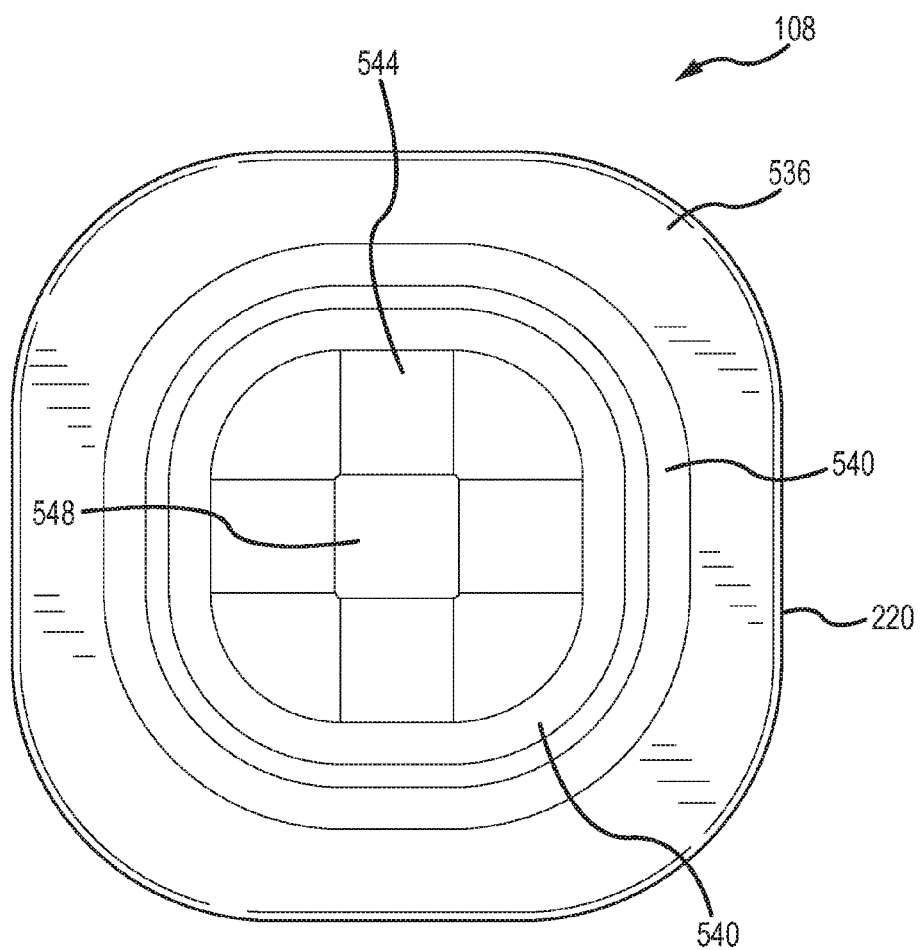
FIG. 6 is a top plan view of the stud of FIG. 5.

Turning now to FIGS. 5-6, a stud 108 according to embodiments of the present disclosure comprises an outer wall 220 and a substantially flat top surface 536. The top surface 536 helps to support the additional layers of the flooring structure, including thinset mortar or other adhesive and the finished flooring. As persons of ordinary skill in the art will appreciate, any load supported by the top surface 536 will act to prevent the outwardly sloping walls 220 from flexing upward, and will thus help to ensure that a heating element 328 installed in between adjacent studs 108 remains in position. Indeed, depending on the rigidity of the studs 108, any load placed thereon may be transferred in part through the outwardly sloping walls 220 to the heating element 328, thus increasing the static friction between the heating element 328 on the one hand and the outer walls 220 and the base layer 104 on the other, and again working to prevent movement of the heating element 328.

According to some embodiments of the present disclosure, one or more raised rings 540 may extend upwardly from the top surface 536 of studs 108. These raised rings 540 may be designed, for example, to provide a vertical or semi-vertical surface above the top surface 536 of the supports 108 to which thinset mortar or other adhesive can bond, thus providing additional surface area for mechanical bonding between the adhesive and the studs 108 in all directions.

Studs 108 also include a smooth inner wall 544 that slopes inwardly and downwardly to define a bowl or cavity within studs 108. The inner wall 544 may begin at or near the top surface 536, including at the upper surface of a raised ring 540, and may slope downwardly to or near the base layer 104 (or to or near the level of the base layer 104). The smooth inner wall 544 allows for more effective decoupling of the finished flooring and the subfloor (including the underlayment 100) by allowing the underlayment 100 to easily separate from the thinset mortar inside the studs 108 to compensate for longitudinal stress and movements. This design is contrary to conventional wisdom in the relevant art, which, as explained by Schluter, holds that the inner wall of supports such as supports 108 should be stepped or corrugated to provide more surface area for thinset bonding to achieve optimal performance. The smooth walls 544 are also beneficial because they can be manufactured from less raw material than stepped or corrugated walls. This simplifies the manufacturing process for the underlayment 100, reduces the cost of the underlayment 100, and conserves resources.

In embodiments, including the present embodiment, the inner wall 544 of a stud 108 surrounds a substantially flat bottom 548 in the bottom of the stud 108. In other embodiments, the inner wall 544 of a stud 108 surrounds a hole or opening. The hole may be open to the base layer 104 of the underlayment 100, or the hole may extend through the base layer 104 to allow air, thinset mortar, or other media to pass above or below the base layer 104. The use of a hole that extends through base layer 104 may facilitate, for example, drying of thinset mortar above or below the underlayment 100, or drainage of water or other liquid through the subflooring structure.

Figure 7:
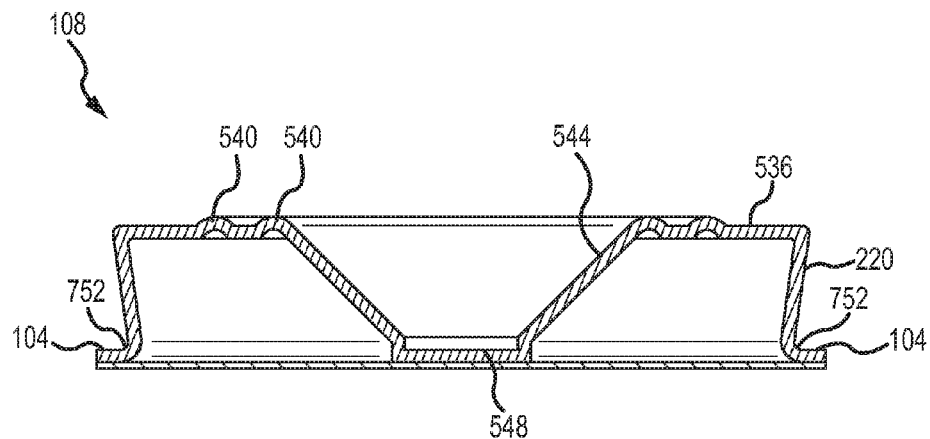
FIG. 7 is a cross-sectional view of the stud of FIG. 5.

FIG. 7 provides a cross-sectional view of a stud 108, in which are visible the outer wall 220, the inner wall 544, the top surface 536, the raised ring 540, the flat bottom 548, and a fillet or curve 752. In embodiments, the fillet 752 forms a curved surface surrounding the entire perimeter of the stud 108 where the outer wall 220 extends from the base layer 104. Thinset mortar or other adhesive can bond to the fillet 752, thus enhancing the adhesive's ability to hold mechanically in all directions. This design is superior to designs in which the fillet 752 extends only, for example, along the straight portions of outer wall 220, in which designs the mechanical bond between the thinset mortar and the underlayment 100 is stronger in the orthogonal directions (corresponding to the directions in which the straight portions of the outer wall 220 are oriented) but weaker in other directions. Like the rounded corners 332 of the outer wall 220, the fillet 752 helps to reduce stress concentrations in any thinset mortar or other adhesive applied over the underlayment 100, which in turn reduces cracking of the adhesive and increases longevity thereof.

Figure 8:
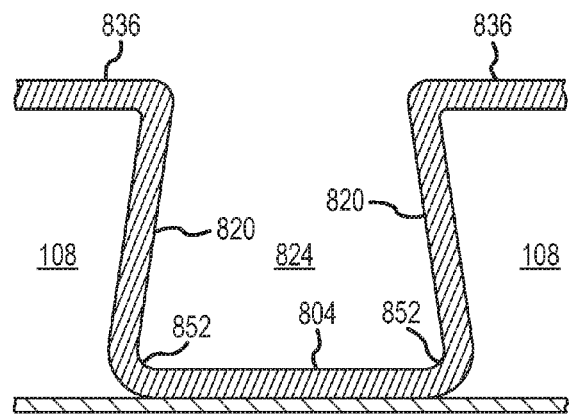
FIG. 8 is a cross-sectional view of a mounting corridor between adjacent studs according to embodiments of the present disclosure.
Figure 9:
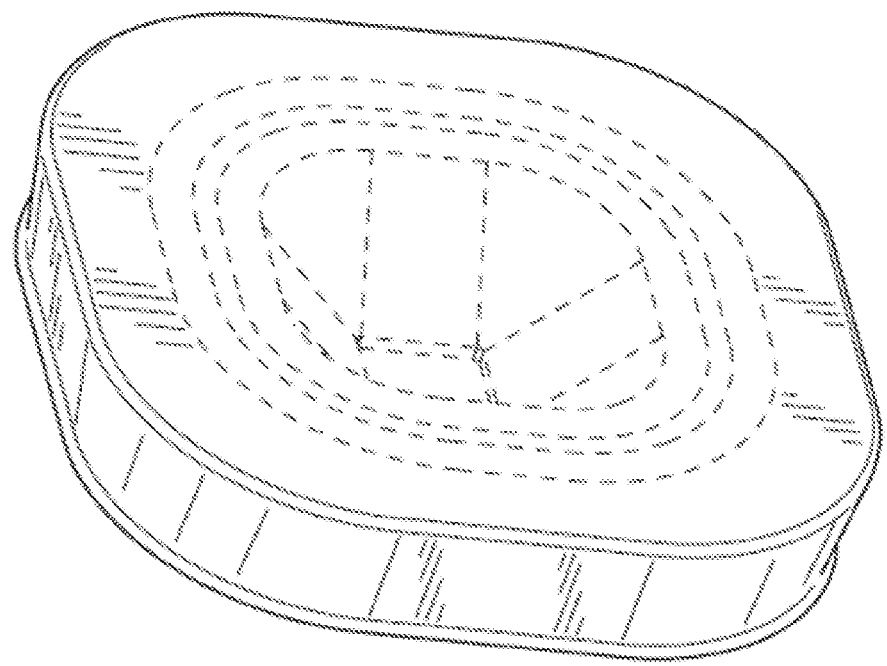
FIG. 9 is a perspective view of a stud according to embodiments of the present disclosure.
Figure 10:
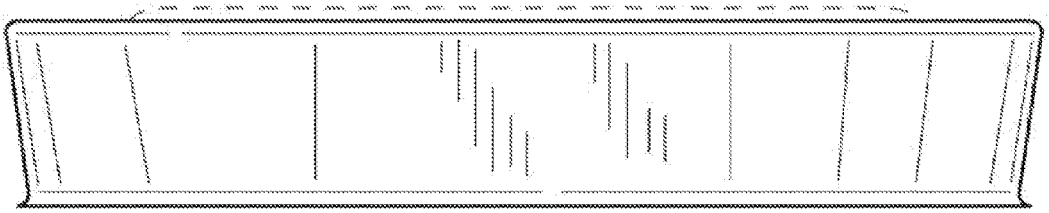
FIG. 10 is a left-side elevation view of the stud illustrated in FIG. 9.
Figure 11:
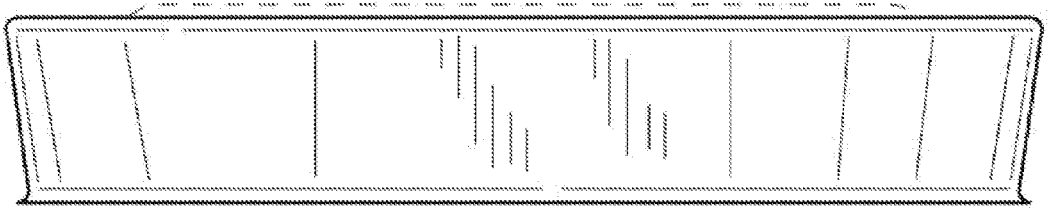
FIG. 11 is a right-side elevation view of the stud illustrated in FIG. 9.
Figure 12:
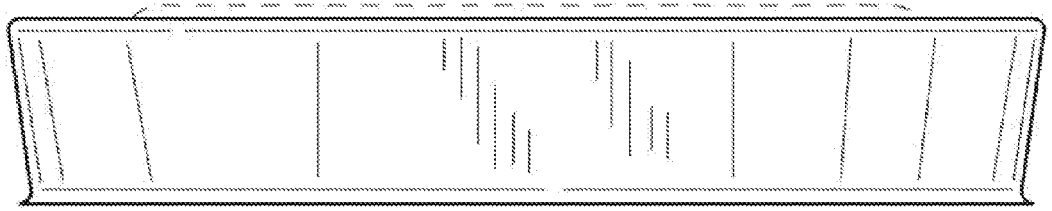
FIG. 12 is a front-side elevation view of the stud illustrated in FIG. 9.
Figure 13:
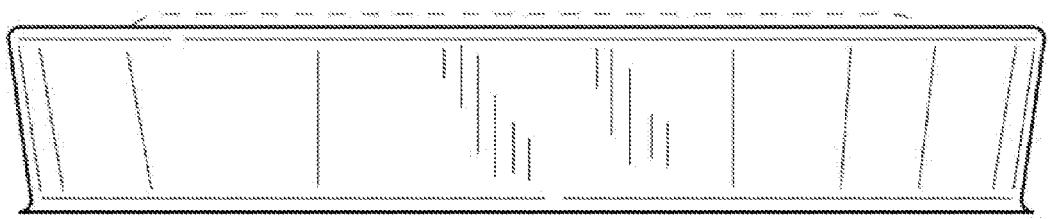
FIG. 13 is a back-side elevation view of the stud illustrated in FIG. 9.
Figure 14:
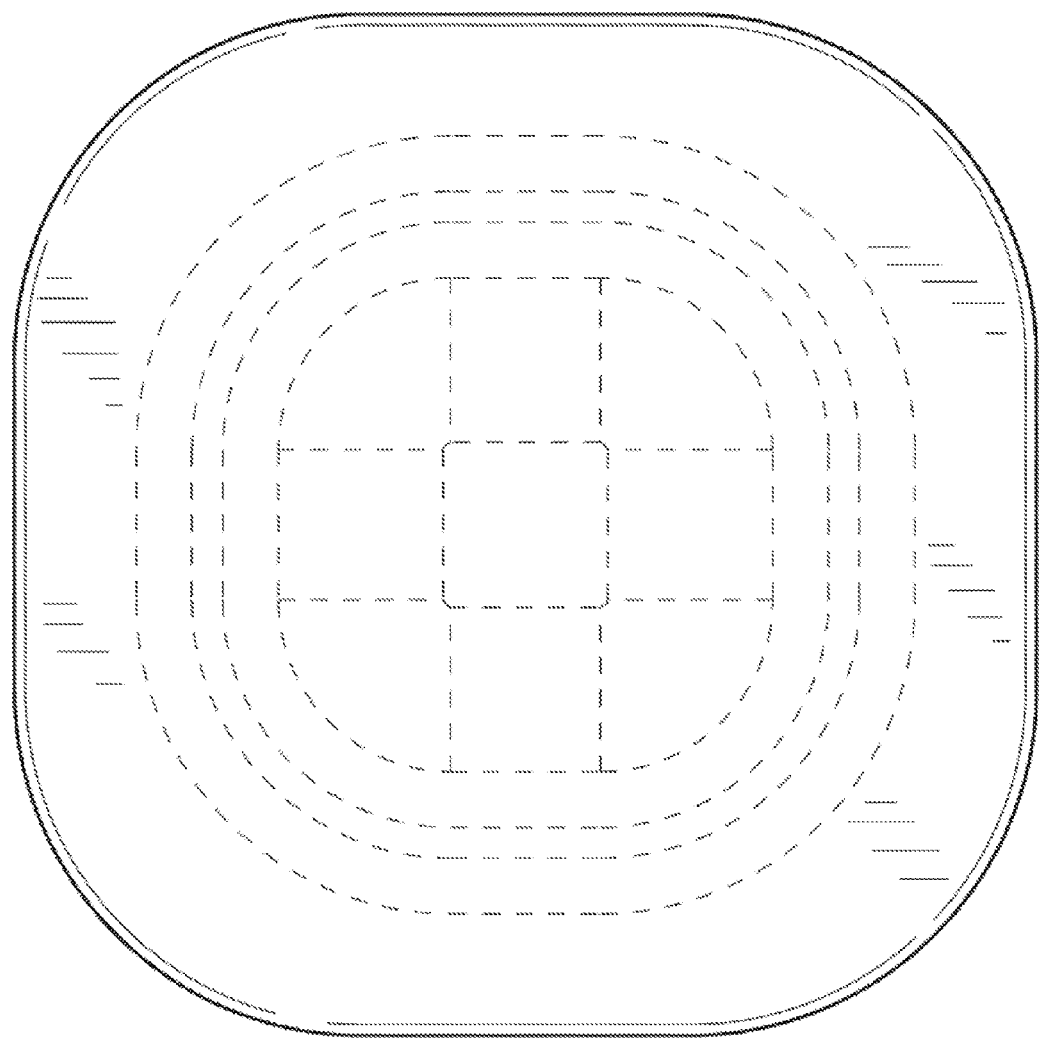
FIG. 14 is a top plan view of the stud illustrated in FIG. 9.
Figure 15:
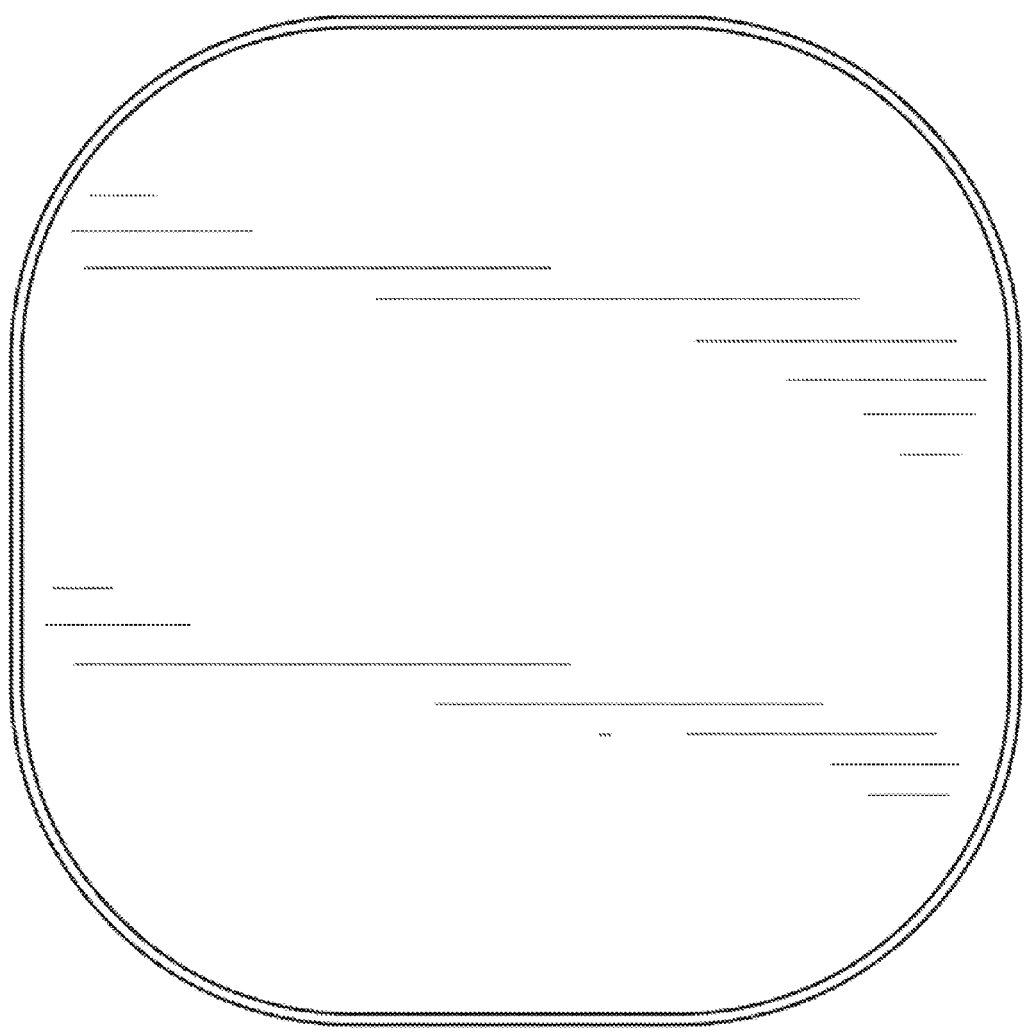
FIG. 15 is a bottom plan view of the stud illustrated in FIG. 9.
Figure 16:
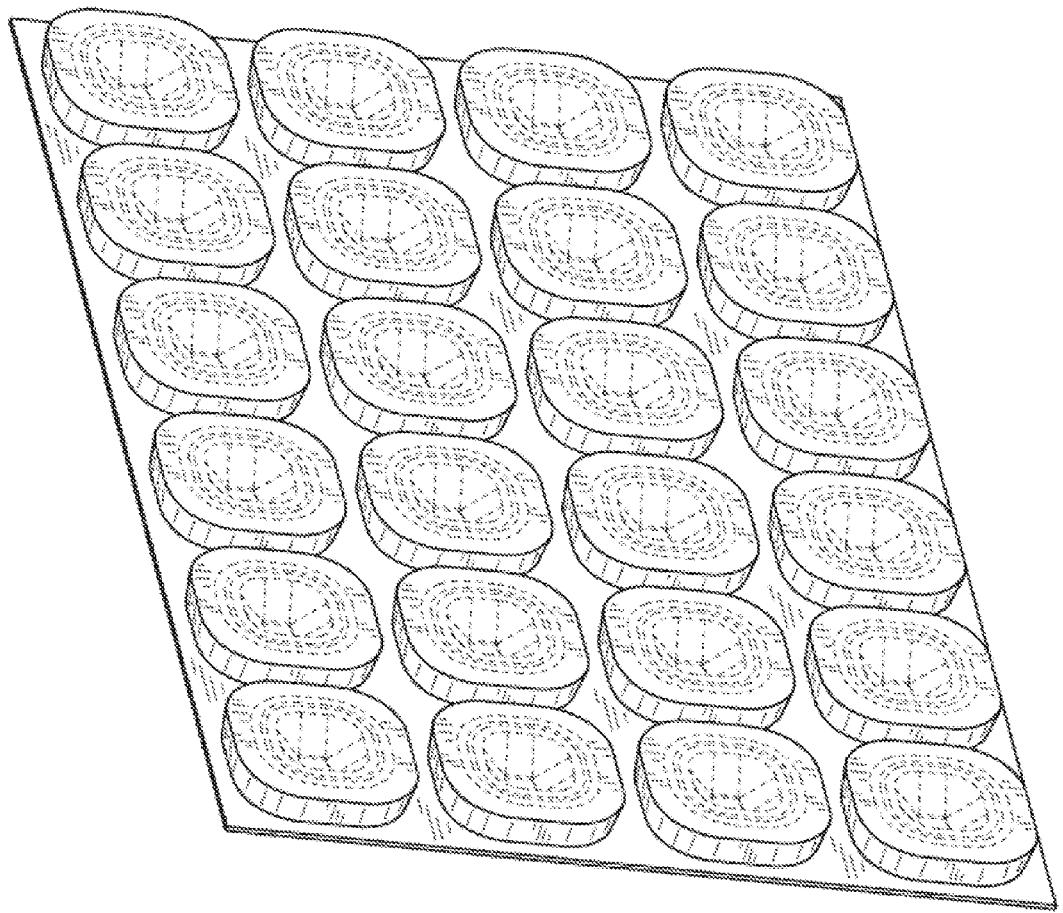
FIG. 16 is a perspective view of an underlayment according to embodiments of the present disclosure.
Figure 17:
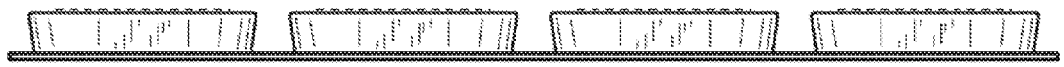
FIG. 17 is a left-side elevation view of the underlayment illustrated in FIG. 16.
Figure 18:
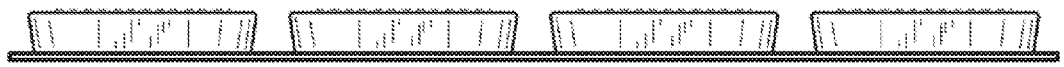
FIG. 18 is a right-side elevation view of the underlayment illustrated in FIG. 16.
Figure 19:
FIG. 19 is a front-side elevation view of the underlayment illustrated in FIG. 16.
Figure 20:
FIG. 20 is a back-side elevation view of the underlayment illustrated in FIG. 16.
Figure 21:
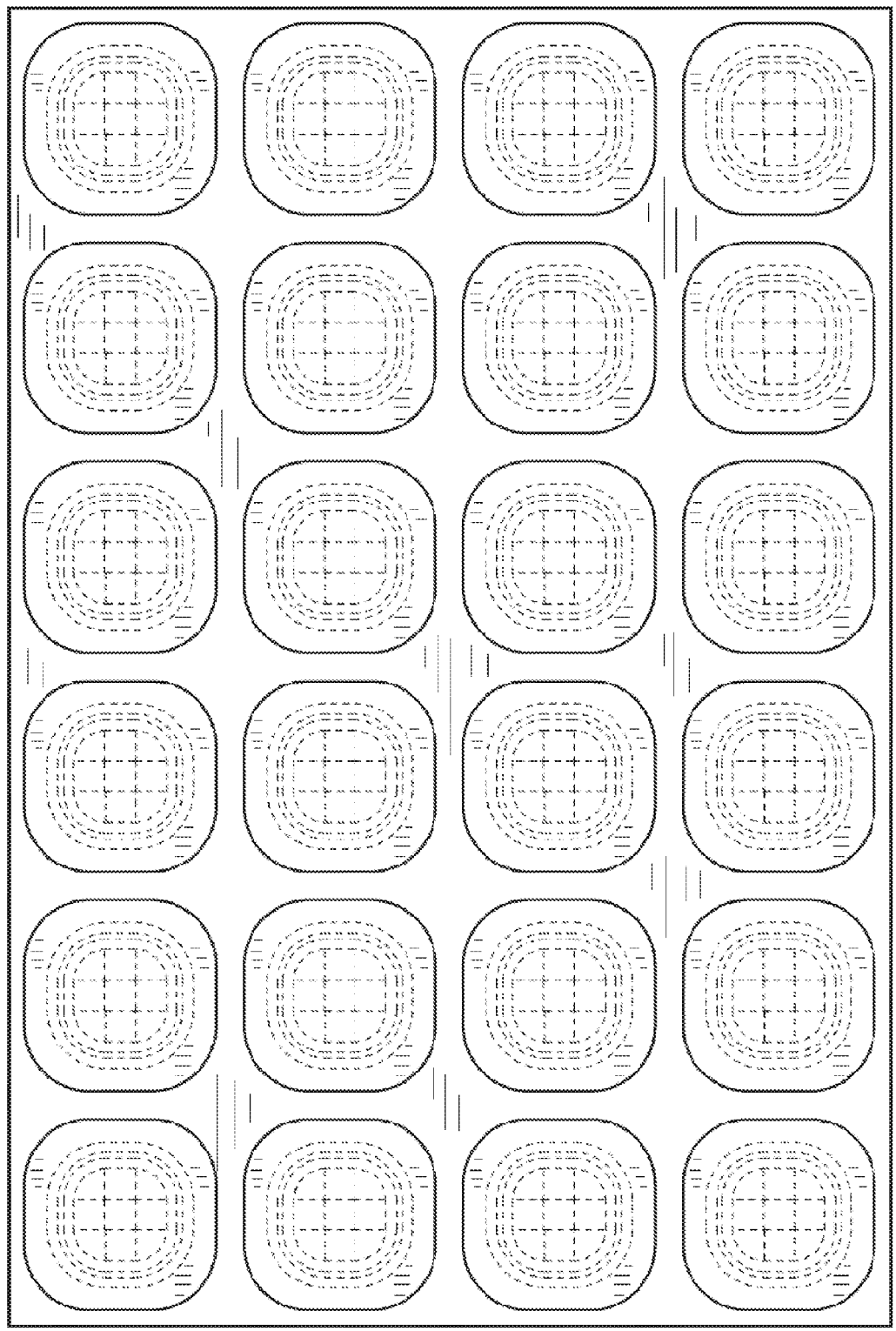
FIG. 21 is a top plan view of the underlayment illustrated in FIG. 16.
Figure 22:
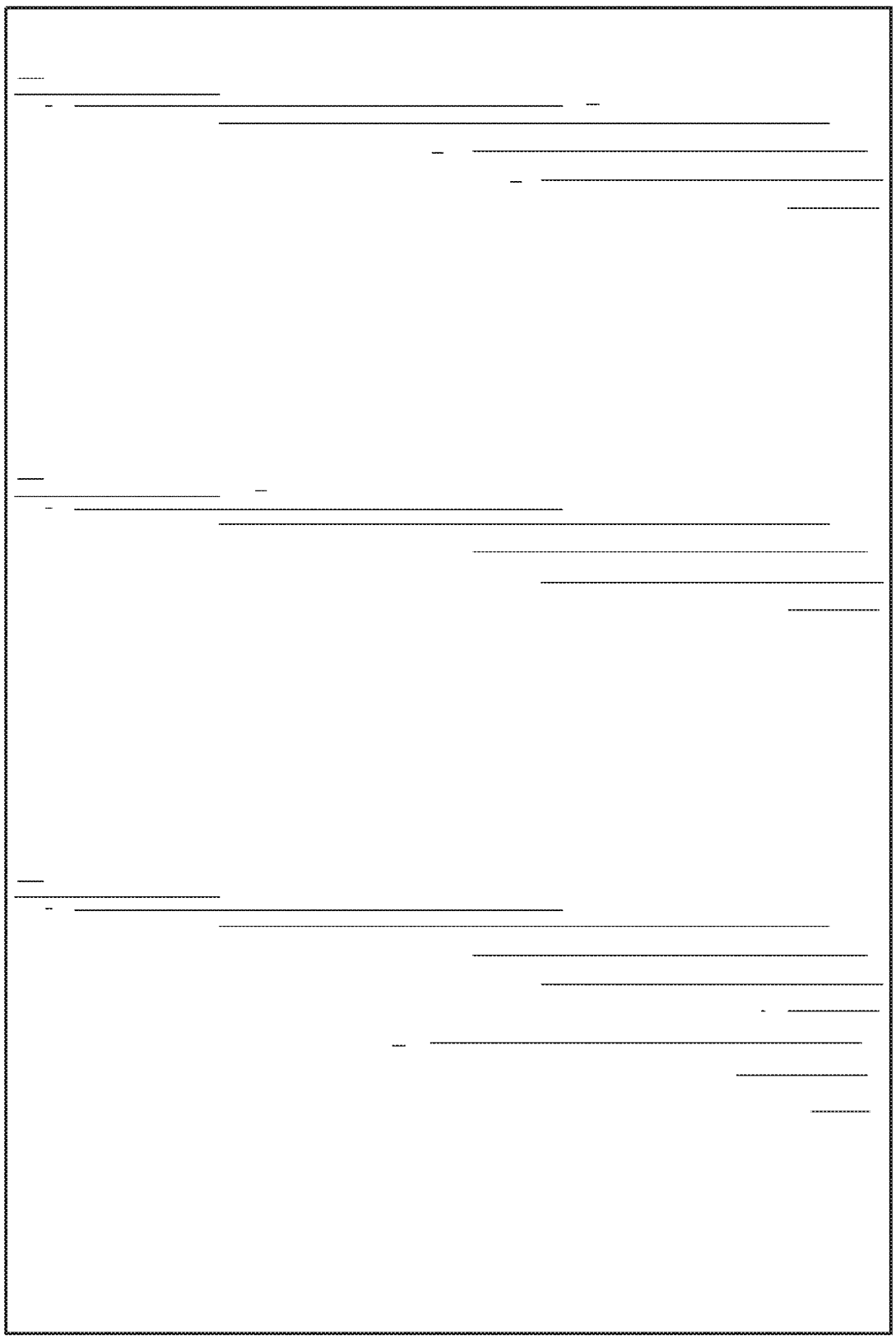
FIG. 22 is a bottom plan view of the underlayment illustrated in FIG. 16.
Figure 23:
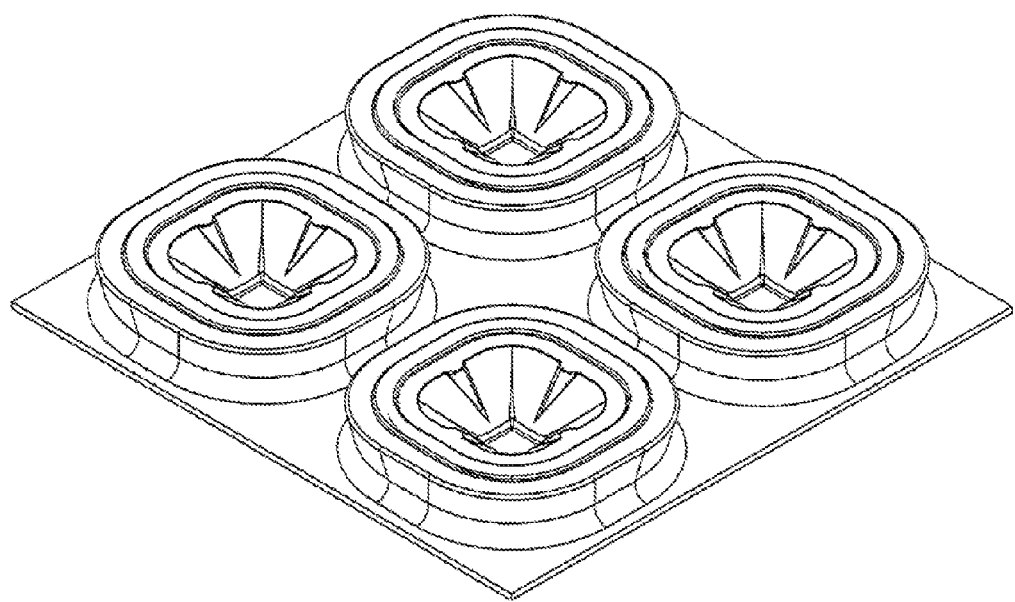
FIG. 23 is a perspective view of the top of an underlayment according to embodiments of the present disclosure.
Figure 24:
FIG. 24 is a front elevation view of the underlayment illustrated in FIG. 23.
Figure 25:
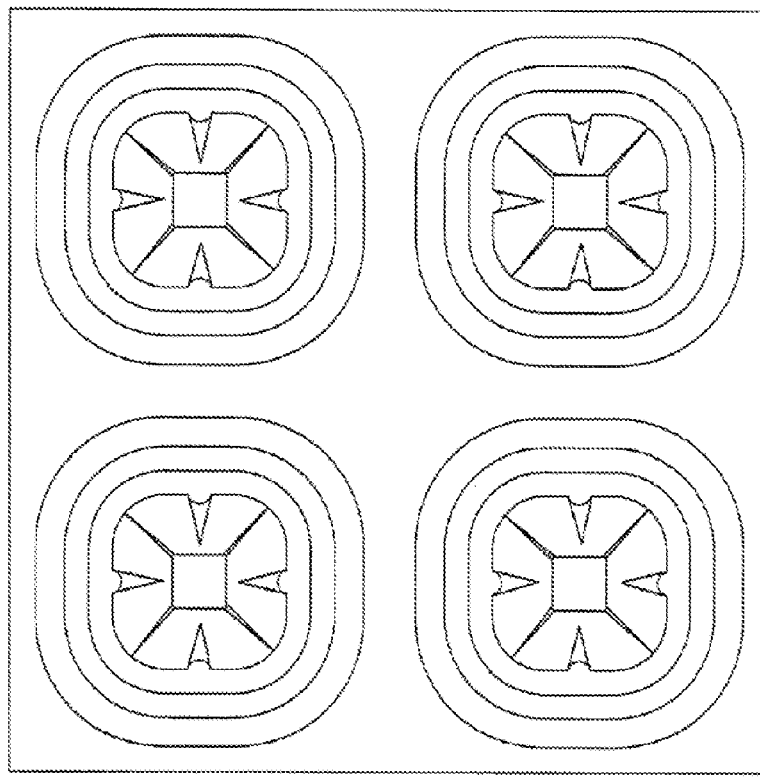
FIG. 25 is a top plan view of the underlayment illustrated in FIG. 23.
Figure 26:
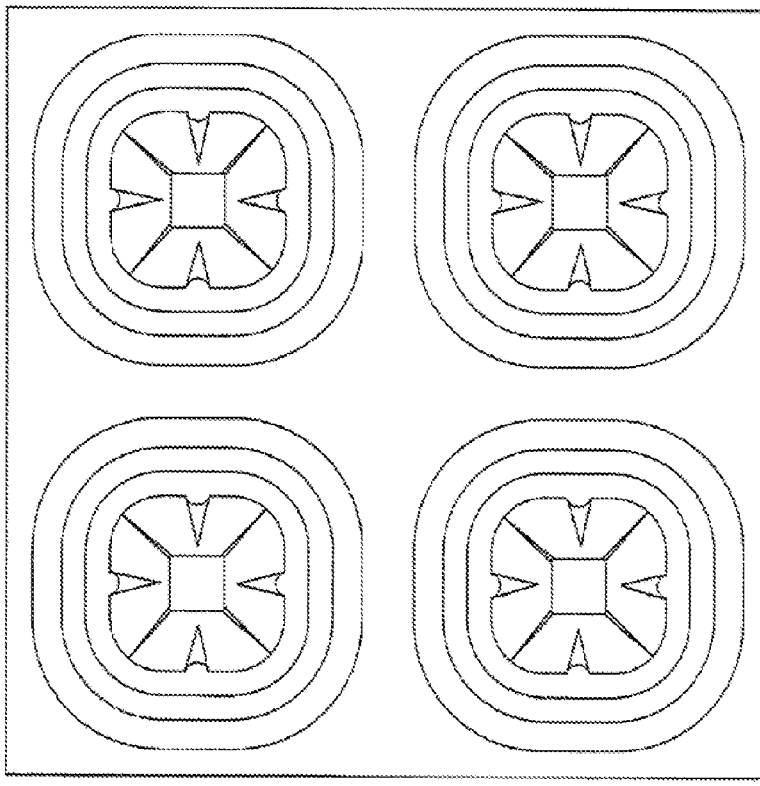
FIG. 26 is a bottom plan view of the underlayment illustrated in FIG. 23.
Figure 27:
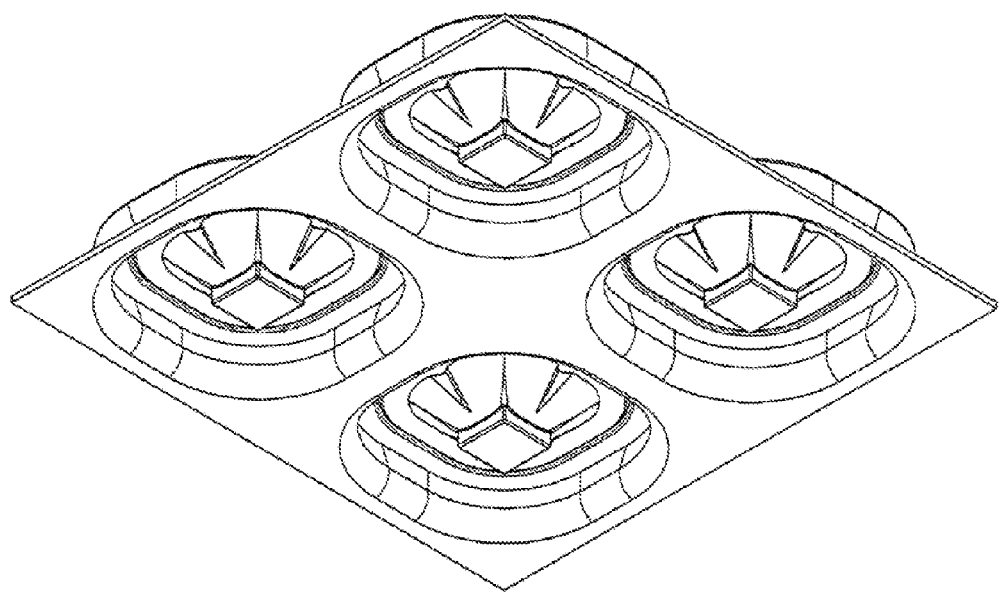
FIG. 27 is a perspective view of the bottom of the underlayment illustrated in FIG. 23.
Figure 28:
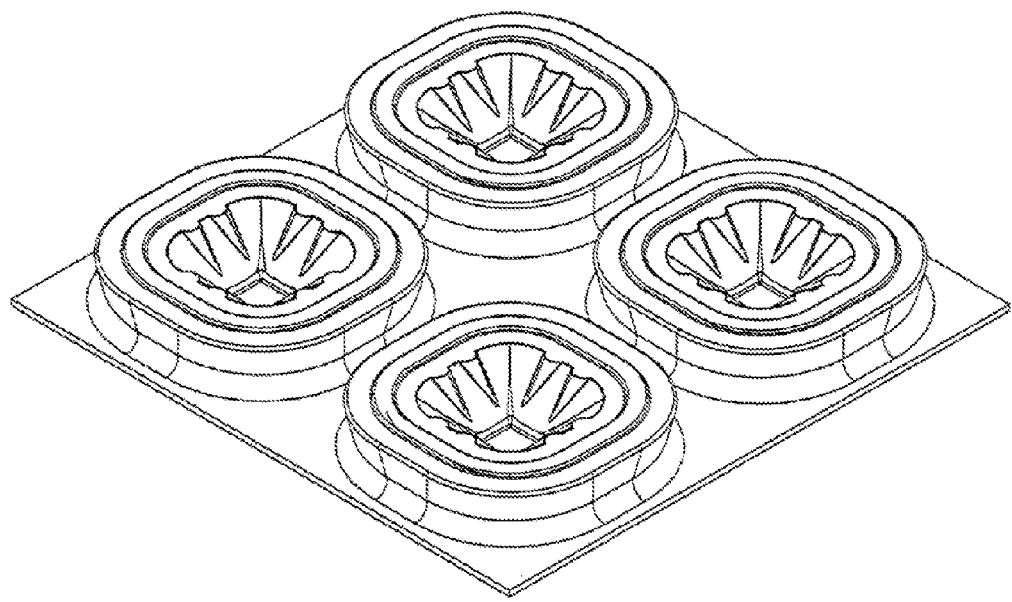
FIG. 28 is a perspective view of the top of an underlayment according to embodiments of the present disclosure.
Figure 29:
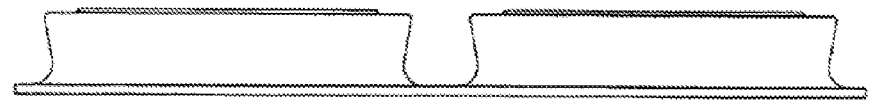
FIG. 29 is a front elevation view of the underlayment illustrated in FIG. 28.
Figure 30:
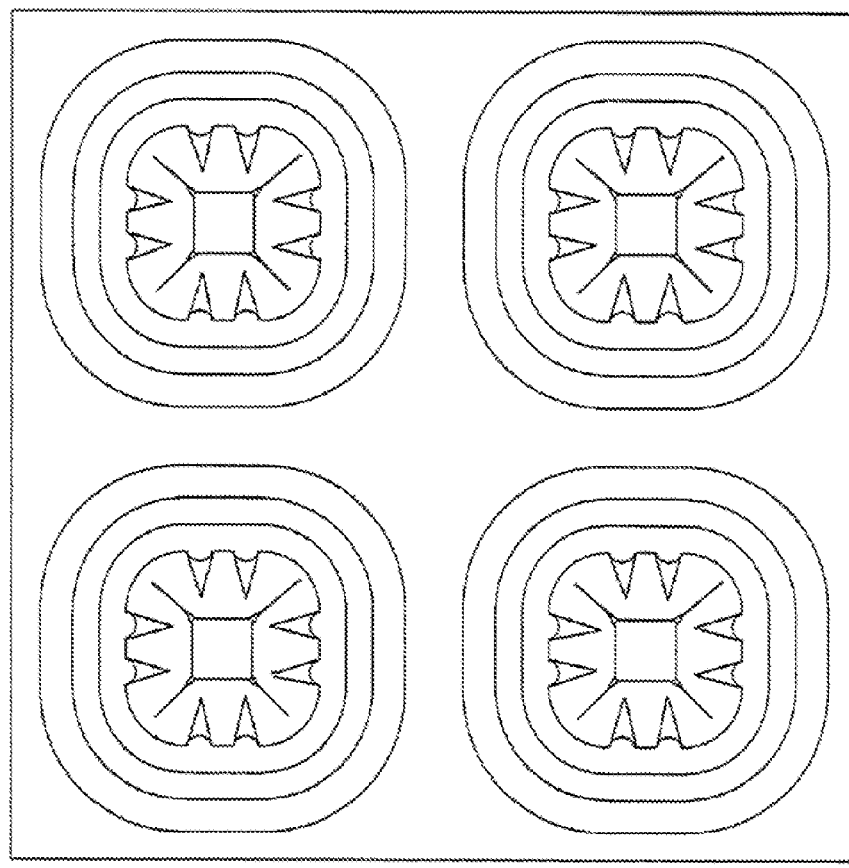
FIG. 30 is a top plan view of the underlayment illustrated in FIG. 28.
Figure 31:
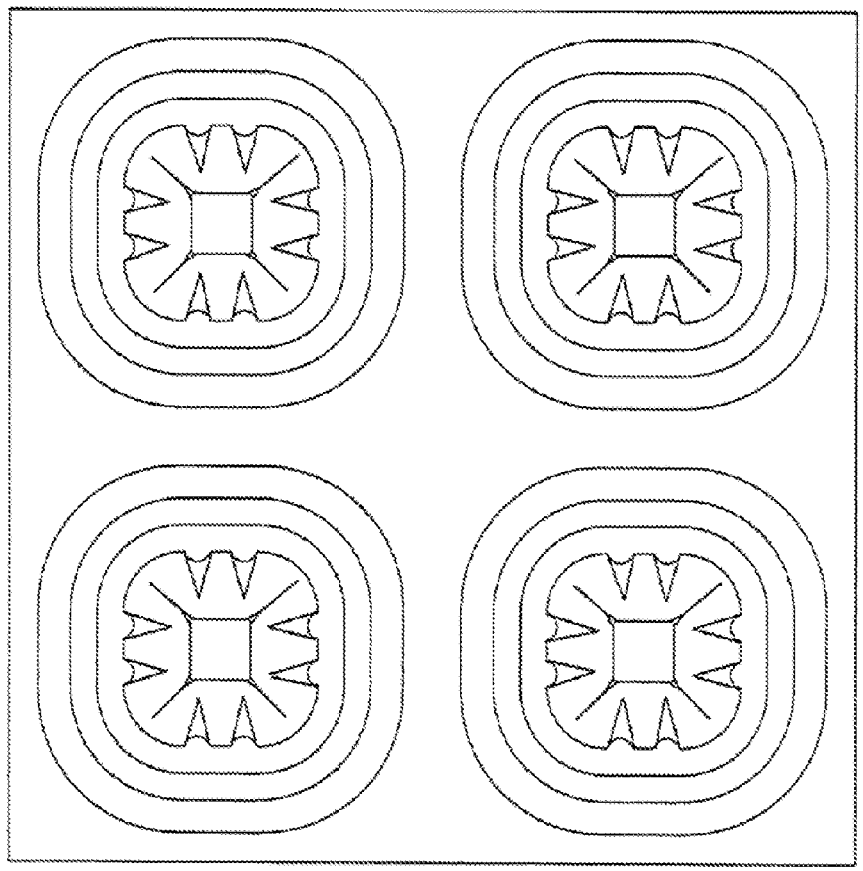
FIG. 31 is a bottom plan view of the underlayment illustrated in FIG. 28.
Figure 32:
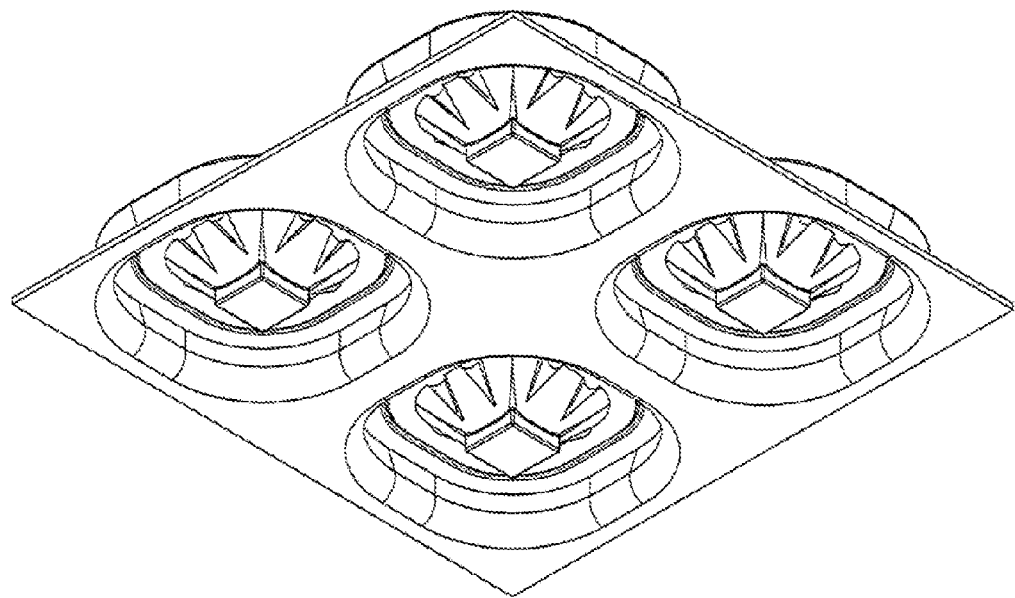
FIG. 32 is a perspective view of the bottom of the underlayment illustrated in FIG. 28.
Figure 33:
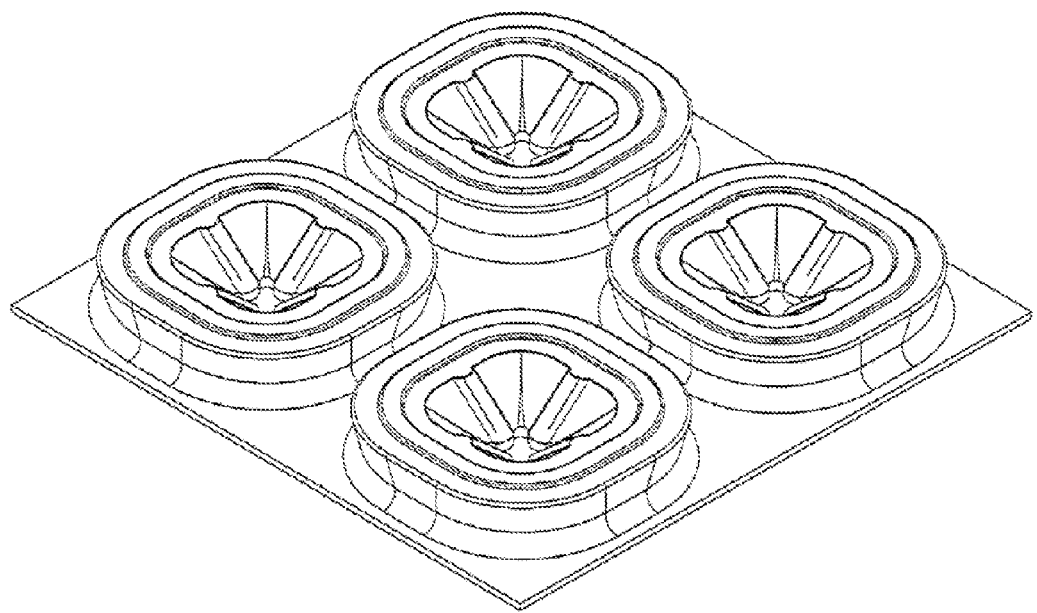
FIG. 33 is a perspective view of the top of an underlayment according to embodiments of the present disclosure.
Figure 34:
FIG. 34 is a front elevation view of the underlayment illustrated in FIG. 33.
Figure 35:
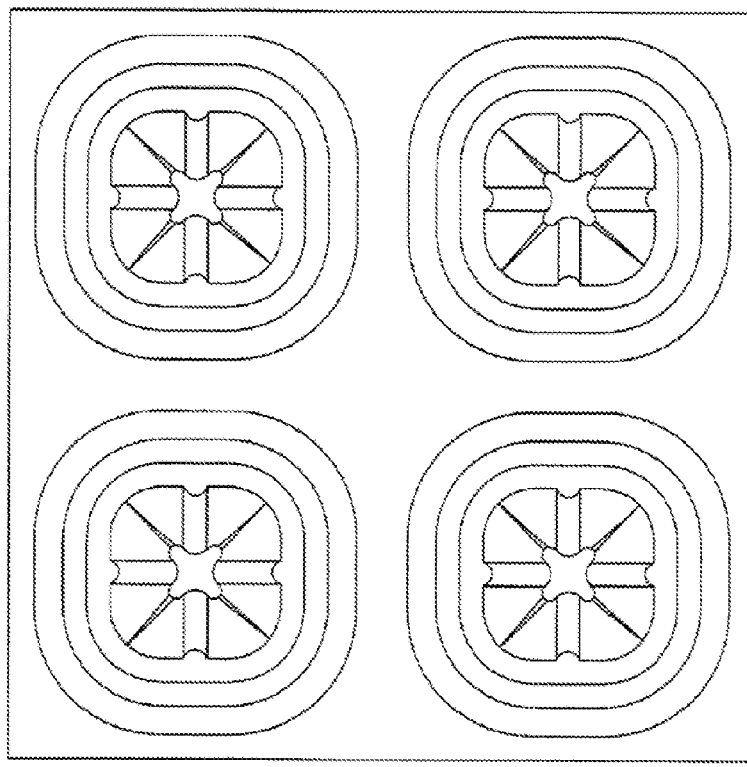
FIG. 35 is a top plan view of the underlayment illustrated in FIG. 33.
Figure 36:
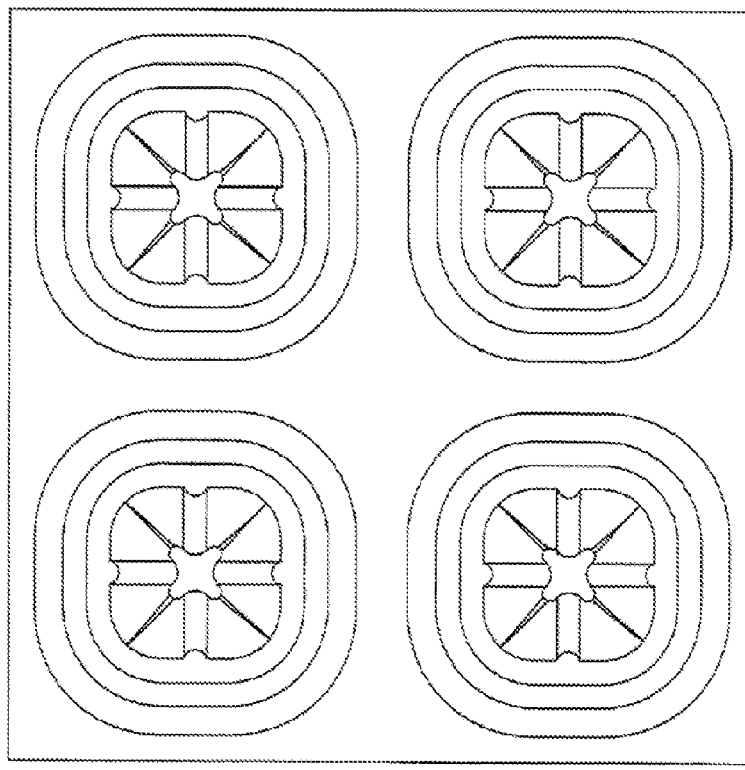
FIG. 36 is a bottom plan view of the underlayment illustrated in FIG. 33.
Figure 37:
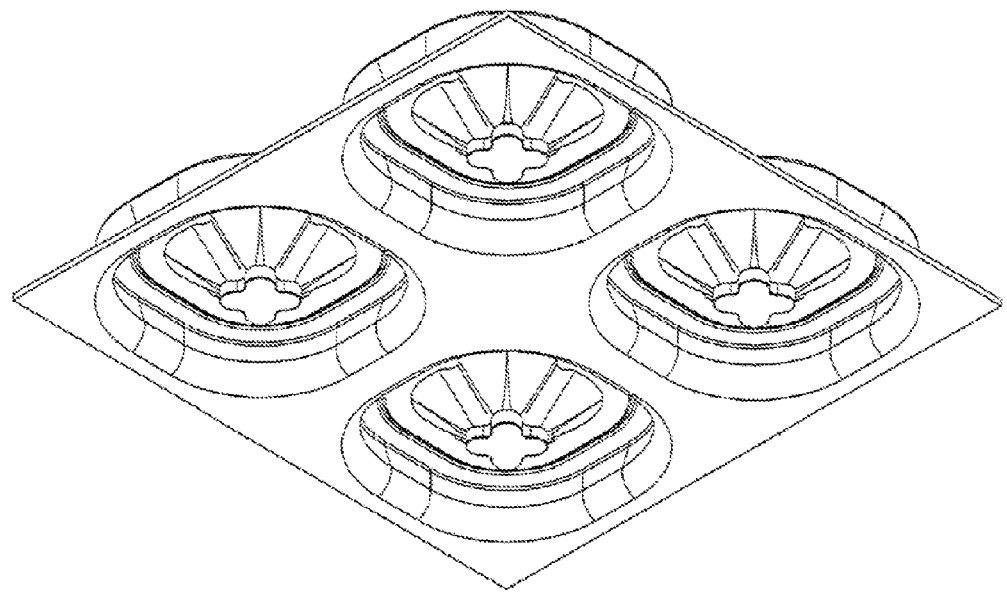
FIG. 37 is a perspective view of the bottom of the underlayment illustrated in FIG. 33.
Figure 38:
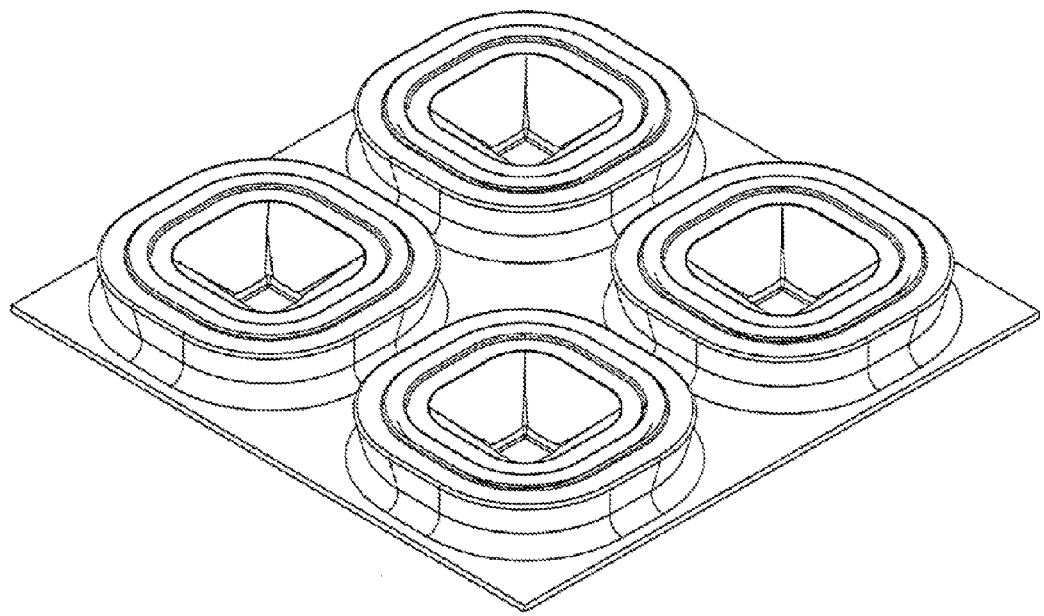
FIG. 38 is a perspective view of the top of an underlayment according to embodiments of the present disclosure.
Figure 39:
FIG. 39 is a front elevation view of the underlayment illustrated in FIG. 38.
Figure 40:
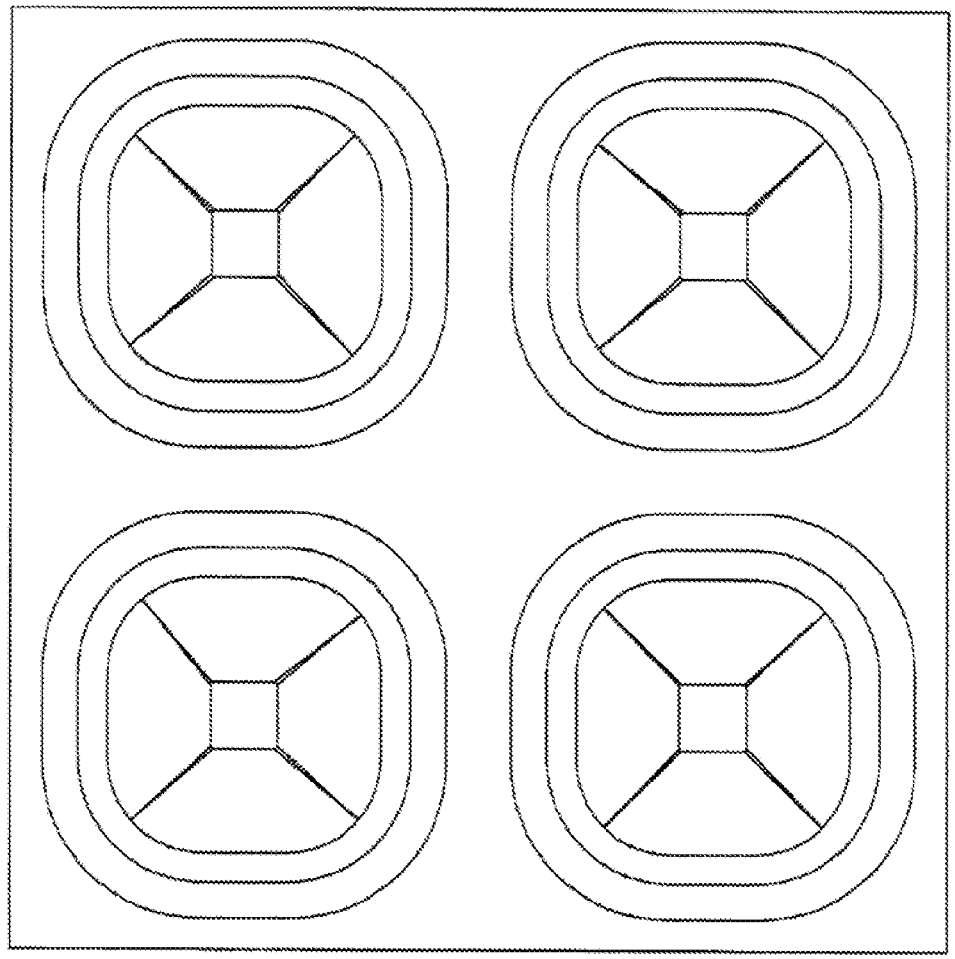
FIG. 40 is a top plan view of the underlayment illustrated in FIG. 38.
Figure 41:
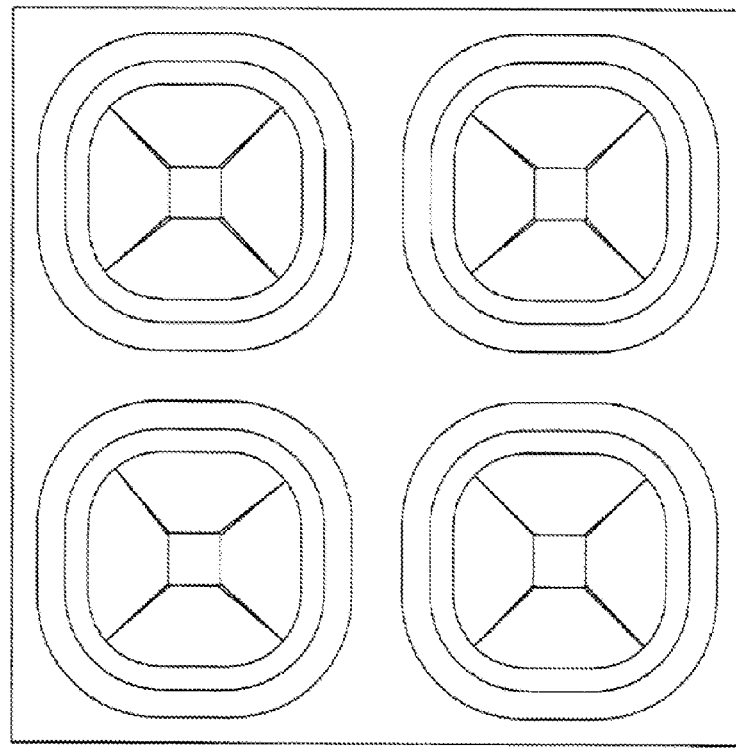
FIG. 41 is a bottom plan view of the underlayment illustrated in FIG. 38.
Figure 42:
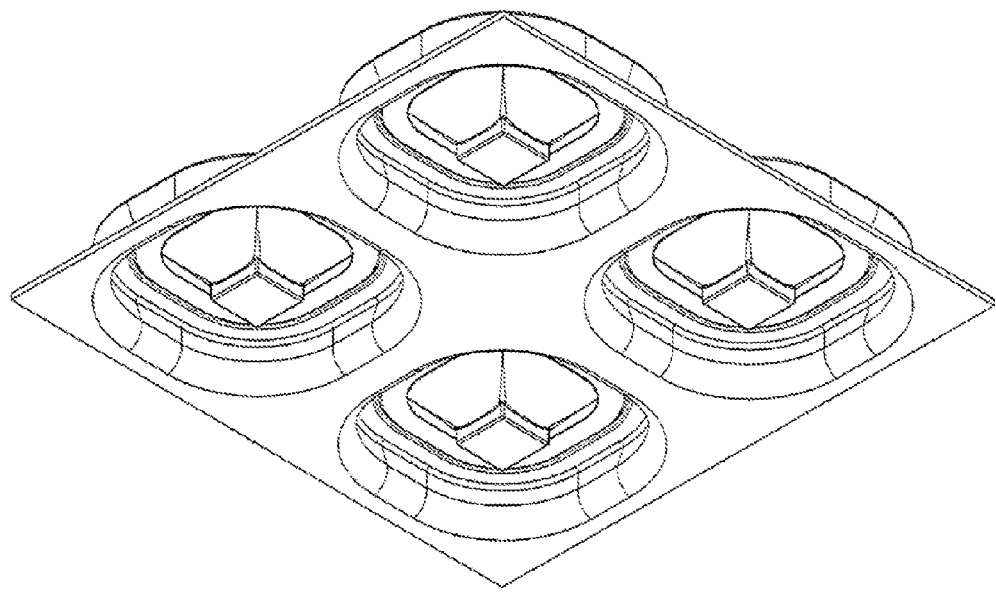
FIG. 42 is a perspective view of the bottom of the underlayment illustrated in FIG. 38.

FIG. 8 provides a cross-sectional view of a mounting corridor 824 between two adjacent studs 108. The mounting corridor is bounded on the bottom by the corridor floor 804 and on the sides by inwardly sloping corridor walls 820. Although the mounting corridor 824 is open at the top (thus allowing a heating element to be pressed into the mounting corridor 824 through the open top thereof), inwardly sloping corridor walls 820 prevent undesired upward movement of heating element installed in the mounting corridor 824. Also visible more clearly in FIG. 8 are the fillets 852, which provide a smooth, curved surface between the corridor floor 804 and the corridor walls 820 around the entire perimeter of the stud 108, and to which an adhesive or bonding material, such as thinset mortar, can bond. Use of the curved fillet 852 rather than a sharp corner at the intersection of the corridor floor 804 and the corridor wall 820 helps to reduce stress concentrations, increase longevity, and improve the mechanical bonding of the adhesive to the underlayment 100 in all directions (because a curved fillet 852 extends around the entire perimeter of each stud 108).

As can be seen from the above description, the apparatus disclosed herein is useful for mounting heating elements beneath a finished floor, and more particularly for extending the longevity of the heating elements by reducing stress concentrations and eliminating other design elements that lead to accelerated wear of the heating elements. Specific details were given in the description to provide a thorough understanding of the embodiments. However, it will be understood by one of ordinary skill in the art that the embodiments may be practiced without these specific details. Further, the aspects of various embodiments described herein may be combined with one another in ways not explicitly described without departing from the scope of the present disclosure. Well-known structures and techniques have been shown without unnecessary detail in order to avoid obscuring the embodiments.

What is claimed is:

1. A floor underlayment, comprising:
   a base layer; and
   a plurality of studs extending from the base layer in rows and columns, each stud shaped as a square with rounded corners so as to provide substantial surface area to contact and support a heating element, each stud further comprising:
      an outer wall that forms an acute angle with the base layer;
      a planar top surface;
      a raised ring extending upwardly from the top surface; and
      a smooth, circumferentially continuous inner wall sloping downwardly and inwardly from near the top surface to near the base layer, the inner wall comprising curved and planar surfaces and defining a cavity within the stud.

2. The floor underlayment of claim 1, wherein the inner wall of each stud surrounds a perimeter of a hole in the base layer.

3. The floor underlayment of claim 1, wherein each stud further comprises a plurality of raised rings extending upwardly from the top surface.

4. The floor underlayment of claim 1, wherein the plurality of studs are integral with the base layer.

5. The floor underlayment of claim 1, wherein a cross section of the outer wall of each stud is substantially square with rounded corners.

6. The floor underlayment of claim 5, wherein the rounded corners of each outer wall have a radius of curvature of about one fourth of the width of the stud.

7. The floor underlayment of claim 1, further comprising a heating element mounted between adjacent studs.

8. A mat for mounting a heating element, the mat comprising:
   a plurality of mounting corridors having an open top, a floor, and sides defined by an outer wall of each of a plurality of adjacent and sequential supports extending upwardly from the floor, each outer wall positioned at an acute angle with the floor and having a fillet at an intersection of the outer wall and the floor,
   wherein each of the plurality of adjacent and sequential supports is shaped as a square with rounded corners so as to provide substantial surface area to contact and support a heating element, and
   wherein at least one of the plurality of adjacent and sequential supports comprises a planar top surface, a raised ring extending upwardly from the top surface, and a circumferentially continuous inner wall defining a cavity within the at least one of the plurality of adjacent and sequential supports, the inner wall comprising curved and planar surfaces.

9. The mat of claim 8, wherein the width of each of the plurality of mounting corridors increases from a local minimum width at the open top of the mounting corridor to a local maximum width near the floor of the mounting corridor.

10. The mat of claim 8, wherein the outer wall defines a perimeter of each of the plurality of adjacent and sequential supports and the fillet extends around the entire perimeter.

11. The mat of claim 8, wherein a distance, at a given height, between the outer walls of adjacent ones of the plurality of adjacent and sequential supports gradually increases immediately before each intersection of one of the plurality of mounting corridors with another one of the plurality of mounting corridors.

12. The mat of claim 8, wherein the floor and each of the plurality of adjacent and sequential supports are formed from the same material.

13. The mat of claim 8, wherein each of the plurality of adjacent and sequential supports comprises a top surface substantially parallel to the floor.

14. The mat of claim 13, wherein a plurality of raised rings extend upwardly from the top surface of each of the plurality of adjacent and sequential supports.

15. The mat of claim 13, wherein the cavity has a maximum width near the top surface and a minimum width near the floor.

16. A subfloor mat comprising:
   a base member formed of a flexible material; and
   a plurality of studs protruding upwardly from the base member, each stud shaped as a square with rounded corners so as to provide substantial surface area to contact and support a heating element, each stud further comprising:
      an outer wall defining a perimeter of the stud;
      a fillet at an intersection of the outer wall and the base member;
      a planar top surface;
      a raised ring extending upwardly from the top surface; and
      a smooth, circumferentially continuous inner wall sloping from near the top surface of the stud to a position near the bottom of the stud, the smooth, circumferentially continuous inner wall comprising curved and planar surfaces and defining a cavity within the perimeter of the stud.

17. The subfloor mat of claim 16, wherein the outer wall forms an acute angle with the base member.

18. The subfloor mat of claim 16, wherein the outer wall comprises alternating substantially planar portions and substantially curved portions.

19. The subfloor mat of claim 16, wherein the cavity has a maximum width near the top of the support and a minimum width near the bottom of the support.

20. The subfloor mat of claim 16, further comprising a heating element positioned between adjacent ones of the plurality of studs.

\* \* \* \* \*